(12) United States Patent
Huang et al.

(10) Patent No.: US 7,565,683 B1
(45) Date of Patent: Jul. 21, 2009

(54) METHOD AND SYSTEM FOR IMPLEMENTING CHANGES TO SECURITY POLICIES IN A DISTRIBUTED SECURITY SYSTEM

(76) Inventors: Weiqing Huang, 187 Acalanes Dr., Apt. 26, Sunnyvale, CA (US) 94086; Senthilvasan Supramaniam, 16461 S. Kennedy Rd., Los Gatos, CA (US) 94070; Klimenty Vainstein, 10526 N. Foothill Blvd., #A, Cupertino, CA (US) 95014

( * ) Notice: Subject to any disclaimer, the term of this patent is extended or adjusted under 35 U.S.C. 154(b) by 592 days.

(21) Appl. No.: 10/186,203

(22) Filed: Jun. 26, 2002

Related U.S. Application Data

(63) Continuation-in-part of application No. 10/075,194, filed on Feb. 12, 2002.

(60) Provisional application No. 60/339,634, filed on Dec. 12, 2001.

(51) Int. Cl.
G06F 21/00 (2006.01)
G06F 15/16 (2006.01)
G06F 9/445 (2006.01)

(52) U.S. Cl. .......................... 726/1; 713/171
(58) Field of Classification Search ................ 726/1
See application file for complete search history.

(56) References Cited

U.S. PATENT DOCUMENTS

| | | | |
|---|---|---|---|
| 4,203,166 A | 5/1980 | Eshram et al. |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,888,800 A | 12/1989 | Marshall et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,220,657 A | 6/1993 | Bly et al. |
| 5,235,641 A | 8/1993 | Nozawa et al. |
| 5,247,575 A | 9/1993 | Sprague et al. |

(Continued)

FOREIGN PATENT DOCUMENTS

EP   0 672 991 A2   9/1995

(Continued)

OTHER PUBLICATIONS

Microsoft Windows 2000 Server. Windows 2000 Group Policy White Paper, 2000.*

(Continued)

*Primary Examiner*—Christopher A Revak
(74) *Attorney, Agent, or Firm*—Sterne, Kessler, Goldstein & Fox PLLC

(57) ABSTRACT

Improved approaches for effectuating changes to security policies in a distributed security system are disclosed. The changes to security policies are distributed to those users (e.g., user and/or computers) in the security system that are affected. The distribution of such changes to security policies can be deferred for those affected users that are not activated (e.g., logged-in or on-line) with the security system.

22 Claims, 16 Drawing Sheets

U.S. PATENT DOCUMENTS

| | | | |
|---|---|---|---|
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A | 5/1995 | Kramer et al. | |
| 5,495,533 A | 2/1996 | Linehan et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,655,119 A | 8/1997 | Davy | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,684,987 A | 11/1997 | Mamiya et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,720,033 A * | 2/1998 | Deo | 726/2 |
| 5,729,734 A | 3/1998 | Parker et al. | |
| 5,732,265 A | 3/1998 | Dewitt et al. | |
| 5,745,573 A | 4/1998 | Lipner et al. | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,778,065 A | 7/1998 | Hauser et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A | 8/1999 | Schneck et al. | |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A | 10/1999 | Salkewicz et al. | |
| 5,987,440 A | 11/1999 | O'Neil et al. | |
| 5,991,879 A | 11/1999 | Still | |
| 5,999,907 A | 12/1999 | Donner | |
| 6,014,730 A | 1/2000 | Ohtsu | |
| 6,023,506 A | 2/2000 | Ote et al. | |
| 6,032,216 A | 2/2000 | Schmuck et al. | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,069,957 A | 5/2000 | Richards | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,158,010 A * | 12/2000 | Moriconi et al. | 726/1 |
| 6,161,139 A | 12/2000 | Win et al. | |
| 6,182,142 B1 | 1/2001 | Win et al. | |
| 6,185,684 B1 | 2/2001 | Pravetz et al. | |
| 6,205,549 B1 | 3/2001 | Pravetz et al. | |
| 6,212,561 B1 | 4/2001 | Sitaraman et al. | |
| 6,223,285 B1 * | 4/2001 | Komuro et al. | 713/160 |
| 6,226,618 B1 | 5/2001 | Downs et al. | |
| 6,226,745 B1 | 5/2001 | Wiederhold et al. | |
| 6,240,188 B1 | 5/2001 | Dondeti et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,272,631 B1 | 8/2001 | Thomlinson et al. | |
| 6,272,632 B1 | 8/2001 | Carmen et al. | |
| 6,282,649 B1 | 8/2001 | Lambert et al. | |
| 6,289,450 B1 | 9/2001 | Pensak et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,409 B2 | 11/2001 | Schneck et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |
| 6,343,316 B1 | 1/2002 | Sakata | |
| 6,347,374 B1 | 2/2002 | Drake et al. | |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,356,941 B1 | 3/2002 | Cohen | |
| 6,357,010 B1 | 3/2002 | Viets et al. | |
| 6,363,480 B1 | 3/2002 | Perlman | |
| 6,370,249 B1 | 4/2002 | Van Oorschot | |
| 6,381,698 B1 | 4/2002 | Devanbu et al. | |
| 6,389,433 B1 | 5/2002 | Bolosky et al. | |
| 6,389,538 B1 | 5/2002 | Gruse et al. | |
| 6,393,420 B1 | 5/2002 | Peters | |
| 6,405,315 B1 | 6/2002 | Burns et al. | |
| 6,421,714 B1 | 7/2002 | Rai et al. | |
| 6,442,688 B1 | 8/2002 | Moses et al. | |
| 6,442,695 B1 | 8/2002 | Dutcher et al. | |
| 6,446,090 B1 | 9/2002 | Hart | |
| 6,449,721 B1 | 9/2002 | Pensak et al. | |
| 6,453,353 B1 | 9/2002 | Win et al. | |
| 6,466,932 B1 | 10/2002 | Dennis et al. | |
| 6,477,544 B1 | 11/2002 | Bolosky et al. | |
| 6,490,680 B1 | 12/2002 | Scheidt et al. | |
| 6,505,300 B2 | 1/2003 | Chan et al. | |

| Patent No. | Date | Inventor(s) | Ref |
|---|---|---|---|
| 6,510,349 B1 | 1/2003 | Schneck et al. | |
| 6,529,956 B1 | 3/2003 | Smith et al. | |
| 6,530,020 B1 | 3/2003 | Aoki | |
| 6,530,024 B1 | 3/2003 | Proctor | |
| 6,542,608 B2 | 4/2003 | Scheidt et al. | |
| 6,549,623 B1 | 4/2003 | Scheidt et al. | |
| 6,550,011 B1 | 4/2003 | Sims | |
| 6,557,039 B1 | 4/2003 | Leong et al. | |
| 6,567,914 B1 | 5/2003 | Just et al. | |
| 6,571,291 B1 | 5/2003 | Chow | |
| 6,584,466 B1 | 6/2003 | Serbinis et al. | |
| 6,587,946 B1 | 7/2003 | Jakobsson | |
| 6,588,673 B1 | 7/2003 | Chan et al. | |
| 6,594,662 B1 | 7/2003 | Sieffert et al. | |
| 6,598,161 B1 | 7/2003 | Kluttz et al. | |
| 6,603,857 B1 | 8/2003 | Batten-Carew et al. | |
| 6,608,636 B1 | 8/2003 | Roseman | |
| 6,611,599 B2 | 8/2003 | Natarajan | |
| 6,615,349 B1 | 9/2003 | Hair | |
| 6,615,350 B1 | 9/2003 | Schell et al. | |
| 6,625,650 B2 | 9/2003 | Stelliga | |
| 6,629,243 B1 | 9/2003 | Kleinman et al. | |
| 6,633,311 B1 | 10/2003 | Douvikas et al. | |
| 6,640,307 B2 | 10/2003 | Viets et al. | |
| 6,646,515 B2 | 11/2003 | Jun et al. | |
| 6,647,388 B2 | 11/2003 | Numao et al. | |
| 6,678,835 B1 | 1/2004 | Shah et al. | |
| 6,687,822 B1 | 2/2004 | Jakobsson | |
| 6,711,683 B1 | 3/2004 | Laczko et al. | |
| 6,718,361 B1 | 4/2004 | Basani et al. | |
| 6,735,701 B1 | 5/2004 | Jacobson | |
| 6,738,908 B1 | 5/2004 | Bonn et al. | |
| 6,775,779 B1 | 8/2004 | England et al. | |
| 6,782,403 B1 | 8/2004 | Kino et al. | |
| 6,801,999 B1 | 10/2004 | Venkatesan et al. | |
| 6,807,534 B1 | 10/2004 | Erickson | |
| 6,807,636 B2 | 10/2004 | Hartman et al. | |
| 6,810,389 B1 | 10/2004 | Meyer | |
| 6,810,479 B1 | 10/2004 | Barlow et al. | |
| 6,816,871 B2 | 11/2004 | Lee | |
| 6,826,698 B1 | 11/2004 | Minkin et al. | |
| 6,834,333 B2 | 12/2004 | Yoshino et al. | |
| 6,834,341 B1 | 12/2004 | Bahl et al. | |
| 6,845,452 B1 | 1/2005 | Roddy et al. | |
| 6,851,050 B2 | 2/2005 | Singhal et al. | |
| 6,865,555 B2 | 3/2005 | Novak | |
| 6,874,139 B2 | 3/2005 | Krueger et al. | |
| 6,877,136 B2 | 4/2005 | Bess et al. | |
| 6,889,210 B1 * | 5/2005 | Vainstein | 705/57 |
| 6,891,953 B1 | 5/2005 | DeMello et al. | |
| 6,892,201 B2 | 5/2005 | Brown et al. | |
| 6,892,306 B1 | 5/2005 | En-Seung et al. | |
| 6,907,034 B1 | 6/2005 | Begis | |
| 6,909,708 B1 * | 6/2005 | Krishnaswamy et al. | 370/352 |
| 6,915,434 B1 | 7/2005 | Kuroda et al. | |
| 6,920,558 B2 | 7/2005 | Sames et al. | |
| 6,931,450 B2 | 8/2005 | Howard et al. | |
| 6,931,530 B2 | 8/2005 | Pham et al. | |
| 6,931,597 B1 * | 8/2005 | Prakash | 715/741 |
| 6,938,042 B2 | 8/2005 | Aboulhosn et al. | |
| 6,941,355 B1 | 9/2005 | Donaghey et al. | |
| 6,941,456 B2 | 9/2005 | Wilson | |
| 6,941,472 B2 | 9/2005 | Moriconi et al. | |
| 6,944,183 B1 | 9/2005 | Iyer et al. | |
| 6,947,556 B1 | 9/2005 | Matyas, Jr. et al. | |
| 6,950,818 B2 | 9/2005 | Dennis et al. | |
| 6,950,936 B2 | 9/2005 | Subramaniam et al. | |
| 6,950,941 B1 * | 9/2005 | Lee et al. | 713/193 |
| 6,950,943 B1 | 9/2005 | Bacha et al. | |
| 6,952,780 B2 | 10/2005 | Olsen et al. | |
| 6,957,261 B2 | 10/2005 | Lortz | |
| 6,959,308 B2 | 10/2005 | Gramsamer et al. | |
| 6,961,849 B1 | 11/2005 | Davis et al. | |
| 6,968,060 B1 | 11/2005 | Pinkas | |
| 6,971,018 B1 | 11/2005 | Witt et al. | |
| 6,978,376 B2 | 12/2005 | Giroux et al. | |
| 6,978,377 B1 * | 12/2005 | Asano et al. | 713/193 |
| 6,988,133 B1 | 1/2006 | Zavalkovsky et al. | |
| 6,988,199 B2 | 1/2006 | Toh et al. | |
| 6,993,135 B2 | 1/2006 | Ishibashi | |
| 6,996,718 B1 | 2/2006 | Henry et al. | |
| 7,003,117 B2 | 2/2006 | Kacker et al. | |
| 7,003,560 B1 | 2/2006 | Mullen et al. | |
| 7,003,661 B2 | 2/2006 | Beattie et al. | |
| 7,013,332 B2 | 3/2006 | Friedel et al. | |
| 7,013,485 B2 | 3/2006 | Brown et al. | |
| 7,020,645 B2 | 3/2006 | Bisbee et al. | |
| 7,024,427 B2 | 4/2006 | Bobbitt et al. | |
| 7,035,854 B2 | 4/2006 | Hsiao et al. | |
| 7,035,910 B1 | 4/2006 | Dutta et al. | |
| 7,046,807 B2 | 5/2006 | Hirano et al. | |
| 7,051,213 B1 | 5/2006 | Kobayashi et al. | |
| 7,058,696 B1 | 6/2006 | Phillips et al. | |
| 7,058,978 B2 | 6/2006 | Feuerstein et al. | |
| 7,073,063 B2 | 7/2006 | Peinado | |
| 7,073,073 B1 | 7/2006 | Nonaka et al. | |
| 7,076,067 B2 | 7/2006 | Raike et al. | |
| 7,076,312 B2 | 7/2006 | Law et al. | |
| 7,076,469 B2 | 7/2006 | Schreiber et al. | |
| 7,076,633 B2 | 7/2006 | Tormasov et al. | |
| 7,080,077 B2 | 7/2006 | Ramamurthy et al. | |
| 7,095,853 B2 | 8/2006 | Morishita | |
| 7,096,266 B2 | 8/2006 | Lewin et al. | |
| 7,099,926 B1 * | 8/2006 | Ims et al. | 709/217 |
| 7,107,269 B2 | 9/2006 | Arlein et al. | |
| 7,120,635 B2 | 10/2006 | Bhide et al. | |
| 7,120,757 B2 | 10/2006 | Tsuge | |
| 7,124,164 B1 | 10/2006 | Chemtob | |
| 7,130,964 B2 * | 10/2006 | Ims et al. | 711/118 |
| 7,131,071 B2 | 10/2006 | Gune et al. | |
| 7,134,041 B2 | 11/2006 | Murray et al. | |
| 7,136,903 B1 | 11/2006 | Phillips et al. | |
| 7,145,898 B1 * | 12/2006 | Elliott | 370/352 |
| 7,146,498 B1 * | 12/2006 | Takechi et al. | 713/158 |
| 7,159,036 B2 | 1/2007 | Hinchliffe et al. | |
| 7,171,557 B2 | 1/2007 | Kallahalla et al. | |
| 7,174,563 B1 | 2/2007 | Brownlie et al. | |
| 7,177,427 B1 * | 2/2007 | Komuro et al. | 380/239 |
| 7,178,033 B1 | 2/2007 | Garcia | |
| 7,181,017 B1 | 2/2007 | Nagel et al. | |
| 7,185,364 B2 | 2/2007 | Knouse et al. | |
| 7,187,033 B2 | 3/2007 | Pendharkar | |
| 7,188,181 B1 | 3/2007 | Squier et al. | |
| 7,194,764 B2 | 3/2007 | Martherus et al. | |
| 7,200,747 B2 | 4/2007 | Riedel et al. | |
| 7,203,317 B2 | 4/2007 | Kallahalla et al. | |
| 7,203,968 B2 * | 4/2007 | Asano et al. | 726/31 |
| 7,219,230 B2 | 5/2007 | Riedel et al. | |
| 7,224,795 B2 | 5/2007 | Takada et al. | |
| 7,225,256 B2 | 5/2007 | Villavicencio | |
| 7,227,953 B2 * | 6/2007 | Shida | 380/203 |
| 7,233,948 B1 * | 6/2007 | Shamoon et al. | 707/9 |
| 7,237,002 B1 | 6/2007 | Estrada et al. | |
| 7,249,044 B2 | 7/2007 | Kumar et al. | |
| 7,260,555 B2 | 8/2007 | Rossmann et al. | |
| 7,265,764 B2 | 9/2007 | Alben et al. | |
| 7,266,684 B2 | 9/2007 | Jancula | |
| 7,280,658 B2 | 10/2007 | Amini et al. | |
| 7,287,055 B2 | 10/2007 | Smith et al. | |
| 7,290,148 B2 * | 10/2007 | Tozawa et al. | 713/189 |
| 7,308,702 B1 | 12/2007 | Thomsen et al. | |
| 7,313,824 B1 | 12/2007 | Bala et al. | |
| 7,319,752 B2 * | 1/2008 | Asano et al. | 380/44 |
| 7,380,120 B1 | 5/2008 | Garcia | |
| 7,383,586 B2 | 6/2008 | Cross et al. | |
| 7,386,529 B2 | 6/2008 | Kiessig et al. | |

| | | | | | | |
|---|---|---|---|---|---|---|
| 2001/0011254 A1 | 8/2001 | Clark | | 2003/0115570 A1 | 6/2003 | Bisceglia |
| 2001/0021255 A1 | 9/2001 | Ishibashi | | 2003/0120601 A1 | 6/2003 | Ouye |
| 2001/0021926 A1 | 9/2001 | Schneck et al. | | 2003/0120684 A1 | 6/2003 | Zuili et al. |
| 2001/0023421 A1 | 9/2001 | Numao et al. | | 2003/0126434 A1 | 7/2003 | Lim et al. |
| 2001/0032181 A1 | 10/2001 | Jakstadt et al. | | 2003/0154381 A1 | 8/2003 | Ouye |
| 2001/0034839 A1 | 10/2001 | Karjoth et al. | | 2003/0159066 A1 | 8/2003 | Staw et al. |
| 2001/0044903 A1 | 11/2001 | Yamamoto et al. | | 2003/0177070 A1 | 9/2003 | Viswanath et al. |
| 2001/0056550 A1 | 12/2001 | Lee | | 2003/0177378 A1 | 9/2003 | Wittkotter |
| 2002/0010679 A1 | 1/2002 | Felsher | | 2003/0182579 A1 | 9/2003 | Leporini et al. |
| 2002/0013772 A1 | 1/2002 | Peinado | | 2003/0196096 A1 | 10/2003 | Sutton |
| 2002/0016921 A1 | 2/2002 | Olsen et al. | | 2003/0197729 A1 | 10/2003 | Denoue et al. |
| 2002/0016922 A1 | 2/2002 | Richards et al. | | 2003/0200202 A1 | 10/2003 | Hsiao et al. |
| 2002/0023208 A1 | 2/2002 | Jancula | | 2003/0217264 A1 | 11/2003 | Martin et al. |
| 2002/0029340 A1 | 3/2002 | Pensak et al. | | 2003/0217333 A1 | 11/2003 | Smith et al. |
| 2002/0031230 A1 | 3/2002 | Sweet et al. | | 2003/0226013 A1 | 12/2003 | Dutertre |
| 2002/0035624 A1 | 3/2002 | Kim | | 2003/0233650 A1 | 12/2003 | Zaner et al. |
| 2002/0042756 A1 | 4/2002 | Kumar et al. | | 2004/0022390 A1 | 2/2004 | McDonald et al. |
| 2002/0046350 A1 | 4/2002 | Lordemann et al. | | 2004/0025037 A1 | 2/2004 | Hair |
| 2002/0050098 A1 | 5/2002 | Chan | | 2004/0039781 A1 | 2/2004 | LaVallee et al. |
| 2002/0056042 A1 | 5/2002 | Van Der Kaay et al. | | 2004/0064710 A1 | 4/2004 | Vainstein |
| 2002/0062240 A1 | 5/2002 | Morinville | | 2004/0068524 A1 | 4/2004 | Aboulhosn et al. |
| 2002/0062245 A1 | 5/2002 | Niu et al. | | 2004/0068664 A1 | 4/2004 | Nachenberg et al. |
| 2002/0069077 A1 | 6/2002 | Brophy et al. | | 2004/0073718 A1 | 4/2004 | Johannessen et al. |
| 2002/0069272 A1 | 6/2002 | Kim et al. | | 2004/0088548 A1 | 5/2004 | Smetters et al. |
| 2002/0069363 A1 | 6/2002 | Winburn | | 2004/0098580 A1 | 5/2004 | DeTreville |
| 2002/0073320 A1 | 6/2002 | Rinkevich et al. | | 2004/0103202 A1 | 5/2004 | Hildebrand et al. |
| 2002/0077986 A1 | 6/2002 | Kobata et al. | | 2004/0103280 A1 | 5/2004 | Balfanz et al. |
| 2002/0077988 A1 | 6/2002 | Sasaki et al. | | 2004/0133544 A1 | 7/2004 | Kiessig et al. |
| 2002/0078361 A1 | 6/2002 | Giroux et al. | | 2004/0158586 A1 | 8/2004 | Tsai |
| 2002/0087479 A1 | 7/2002 | Malcolm | | 2004/0193602 A1 | 9/2004 | Liu et al. |
| 2002/0091745 A1 | 7/2002 | Ramamurthy et al. | | 2004/0193905 A1 | 9/2004 | Lirov et al. |
| 2002/0099947 A1 | 7/2002 | Evans | | 2004/0193912 A1 | 9/2004 | Li et al. |
| 2002/0124180 A1 | 9/2002 | Hagman | | 2004/0199514 A1 | 10/2004 | Rosenblatt et al. |
| 2002/0129235 A1 | 9/2002 | Okamoto et al. | | 2004/0215956 A1 | 10/2004 | Venkatachary et al. |
| 2002/0133699 A1 | 9/2002 | Pueschel | | 2004/0215962 A1 | 10/2004 | Douceur et al. |
| 2002/0138762 A1 | 9/2002 | Horne | | 2004/0243853 A1 | 12/2004 | Swander et al. |
| 2002/0143710 A1 | 10/2002 | Liu | | 2005/0021467 A1 | 1/2005 | Franzdonk |
| 2002/0143906 A1 | 10/2002 | Tormasov et al. | | 2005/0021629 A1 | 1/2005 | Cannata et al. |
| 2002/0156726 A1 | 10/2002 | Kleckner et al. | | 2005/0028006 A1 | 2/2005 | Leser et al. |
| 2002/0157016 A1 | 10/2002 | Russell et al. | | 2005/0039034 A1 | 2/2005 | Doyle et al. |
| 2002/0162104 A1 | 10/2002 | Raike et al. | | 2005/0071275 A1 | 3/2005 | Vainstein et al. |
| 2002/0169963 A1 | 11/2002 | Seder et al. | | 2005/0071657 A1 | 3/2005 | Ryan |
| 2002/0169965 A1 | 11/2002 | Hale et al. | | 2005/0071658 A1 | 3/2005 | Nath et al. |
| 2002/0172367 A1 | 11/2002 | Mulder et al. | | 2005/0081029 A1 | 4/2005 | Thornton et al. |
| 2002/0174109 A1 | 11/2002 | Chandy et al. | | 2005/0086531 A1 | 4/2005 | Kenrich |
| 2002/0176572 A1 | 11/2002 | Ananth | | 2005/0091484 A1 | 4/2005 | Thornton et al. |
| 2002/0178271 A1 | 11/2002 | Graham et al. | | 2005/0120199 A1 | 6/2005 | Carter |
| 2002/0194484 A1 | 12/2002 | Bolosky et al. | | 2005/0138371 A1 | 6/2005 | Supramaniam |
| 2002/0198798 A1 | 12/2002 | Ludwig et al. | | 2005/0138383 A1 | 6/2005 | Vainstein |
| 2003/0009685 A1 | 1/2003 | Choo et al. | | 2005/0177716 A1 | 8/2005 | Ginter et al. |
| 2003/0014391 A1 | 1/2003 | Evans et al. | | 2005/0177858 A1 | 8/2005 | Ueda |
| 2003/0023559 A1 | 1/2003 | Choi et al. | | 2005/0198326 A1 | 9/2005 | Schlimmer et al. |
| 2003/0028610 A1 | 2/2003 | Pearson | | 2005/0223242 A1 | 10/2005 | Nath |
| 2003/0033528 A1 | 2/2003 | Ozog et al. | | 2005/0223414 A1 | 10/2005 | Kenrich et al. |
| 2003/0037133 A1 | 2/2003 | Owens | | 2005/0256909 A1 | 11/2005 | Aboulhosn et al. |
| 2003/0037237 A1 | 2/2003 | Abgrall et al. | | 2005/0273600 A1 | 12/2005 | Seeman |
| 2003/0037253 A1 | 2/2003 | Blank et al. | | 2005/0283610 A1 | 12/2005 | Serret-Avila et al. |
| 2003/0046238 A1 | 3/2003 | Nonaka et al. | | 2005/0288961 A1 | 12/2005 | Tabrizi |
| 2003/0050919 A1 | 3/2003 | Brown et al. | | 2006/0005021 A1 | 1/2006 | Torrubia-Saez |
| 2003/0051039 A1 | 3/2003 | Brown et al. | | 2006/0075465 A1 | 4/2006 | Ramanathan et al. |
| 2003/0056139 A1 | 3/2003 | Murray et al. | | 2006/0093150 A1 | 5/2006 | Reddy et al. |
| 2003/0074580 A1 | 4/2003 | Knouse et al. | | 2006/0168147 A1 | 7/2006 | Inoue et al. |
| 2003/0078959 A1 | 4/2003 | Yeung et al. | | 2006/0230437 A1 | 10/2006 | Boyer et al. |
| 2003/0079175 A1 | 4/2003 | Limantsev | | 2007/0006214 A1* | 1/2007 | Dubal et al. ............... 717/171 |
| 2003/0081784 A1 | 5/2003 | Kallahalla et al. | | | | |
| 2003/0081787 A1 | 5/2003 | Kallahalla et al. | | FOREIGN PATENT DOCUMENTS | | |
| 2003/0088517 A1 | 5/2003 | Medoff | | | | |
| 2003/0088783 A1 | 5/2003 | DiPierro | | EP | 0 674 253 A1 | 9/1995 |
| 2003/0110169 A1 | 6/2003 | Zuili | | EP | 0 809 170 A1 | 11/1997 |
| 2003/0110266 A1 | 6/2003 | Rollins et al. | | EP | 0 913 966 A2 | 5/1999 |
| 2003/0110397 A1 | 6/2003 | Supramaniam | | EP | 0 913 967 A2 | 5/1999 |
| 2003/0115146 A1 | 6/2003 | Lee et al. | | EP | 0 950 941 A2 | 10/1999 |
| 2003/0115218 A1 | 6/2003 | Bobbitt et al. | | EP | 0 950 941 A3 | 10/1999 |

| | | |
|---|---|---|
| EP | 1 107 504 B1 | 6/2001 |
| EP | 1 107504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

Symantec. Norton Antivirus Corporate Edition Implementation Guide, 1999.*

U.S. Appl. No. 10/076,254, Alain Rossmann, Method and Architecture for Providing Pervasive Security to Digital Assets, filed Feb. 12, 2002.

U.S. Appl. No. 10/075,194, Klimenty Vainstein, System and Method for Providing Multi-Location Access Management to Secured Items, filed Feb. 12, 2002.

U.S. Appl. No. 10/246,079, Hal S. Hildebrand, Security System for Generating Keys from Access Rules in a Decentralized Manner and Methods Therefor, filed Sep. 17, 2002.

U.S. Appl. No. 10/327,320, Klimenty Vainstein, Security System with Staging Capabilities, filed Dec. 20, 2002.

U.S. Appl. No. 10/676,850, Nicholas M. Ryan, Method and System for Securing Digital Assets Using Time-Based Security Criteria, filed Sep. 30, 2003.

U.S. Appl. No. 10/742,710, Senthilvasan Supramaniam, Method and System for Distribution of Notifications in File Security Systems, filed Dec. 19, 2003.

U.S. Appl. No. 10/815,251, Satyajit Nath, Method and System for Providing Document Retention Using Cryptography, filed Mar. 30, 2004.

U.S. Appl. No. 10/815,229, Michael Frederick Kenrich, Method and System for Providing Cryptographic Document Retention with Off-Line Access, filed Mar. 30, 2004.

U.S. Appl. No. 10/894,493, Michael Frederick Kenrich, Multi-Level File Digests, filed Jul. 19, 2004.

"Expiration Mechanism for Chipcards," IBM Technical Disclosure Bulletin, Oct. 1, 2001, UK.

McDaniel et al., "Antigone: A Flexible Framework for Secure Group Communication," Proceedings of the 8th USENIX Security Symposium, Aug. 23, 1999.

"Inside Encrypting File System," Part 1, from MSDN Oct. 2001 version, exact publication date is unknown but believed prior to Dec. 12, 2001.

"Inside Encrypting File System," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

"How EFS Works," from MSDN Oct. 2001 version, exact publication date is unknown but believed prior to Dec. 12, 2001.

"Encrypting File System," from MSDN Oct. 2001 version, exact publication date is unknown but believed prior to Dec. 12, 2001.

"Features of EFS," from MSDN Oct. 2001 version, exact publication date is unknown but believed prior to Dec. 12, 2001.

"Windows 2000 EFS," in the Apr. 1999 issue of Windows NT Magazine.

Stallings, William, "Cryptography and Network Security: Principles and Practice," 1999, pp. 333-337, Second Edition, Prentice Hall, Upper Saddle River, New Jersey.

"Affect," The American Heritage Dictionary of the English Language, Fourth Edition, Houghton Mifflin Company, 2002. Retrieved May 4, 2006 from http://dictionary.reference.com/search?q=affect.

Examination Report, completion date Jun. 18, 2008, for European Patent Application No. EP 02 258 532.7-1244, 6 pgs.

Office Action, dated May 10, 2005, for European Patent Application No. 02258532.7, 5 pgs.

Office Action, dated Dec. 5, 2006, for European Patent Application No. 02258532.7, 5 pgs.

Boneh et al., "Hierarchical Identity Based Encryption with Constant Size Ciphertext," Advances in Cryptology- EUROCRYPT 2005, vol. 3493, Jun. 20, 2005, pp. 440-456.

Boneh et al., "IBE Secure E-mail," Stanford University, Apr. 8, 2002, http://crypto.stanford.edu/ibe/.

Microsoft Windows 200 server. Windows 2000 Group Policy White Paper, 2000.

Crocker, Steven Toye, "Multi-level cryptographic transformations for securing digital assets," U.S. Appl. No. 10/404,566, filed Mar. 31, 2003.

Crocker, Steven Toye, "Effectuating access policy changes to designated places for secured files," U.S. Appl. No. 10/259,075, filed Sep. 27, 2002.

Kenrich, Michael Frederick, "Multi-Level File Digest", U.S. Appl. No. 10/894,493, filed Jul. 19, 2004.

Kinghorn, Gary Mark, "Method and system for protecting electronic data in enterprise environment," U.S. Appl. No. 10/159,220, filed May 31, 2002.

Nath, Satyajit, "Method and system for securing digital assets using content type designations," U.S. Appl. No. 10/405,587, filed Apr. 1, 2003.

Prakash, Nalini J., "Method and apparatus for securing/unsecuring files by file crawling," U.S. Appl. No. 10/325,102, filed Dec. 20, 2002.

Rossmann, Alain, "Hybrid systems for securing digital assets," U.S. Appl. No. 10/325,013, filed Dec. 20, 2002.

A Real-Time Push-Pull Communications Model for Distributed Real-Time and Multimedia Systems, Jan. 1999, School of Computer Sciences Carnegie Mellon University, Kanaka Juvva, Raj Rajkumar.

U.S. Appl. No. 10/889,685, entitled "Method and Apparatus for Controlling the Speed Ranges of a Machine" inventor Thomas, Jul. 13, 2004, 18 pgs.

U.S. Appl. No. 10/028,397, entitled "Method and system for restricting use of a clipboard application," inventor Zuili, Dec. 21, 2001, 38 pgs.

U.S. Appl. No. 10/368,277, entitled "Method and apparatus for uniquely identifying files," inventor Ouye, Feb. 18, 2003, 25 pgs.

U.S. Appl. No. 10/327,320, entitled "Security system with staging capabilities" inventor Vainstein, Dec. 20, 2002, 39 pgs.

U.S. Appl. No. 10/286,524, entitled "Security system that uses indirect password-based encryption," inventor Gutnik, Nov. 1, 2002, 38 pgs.

U.S. Appl. No. 10/242,185, entitled "Method and system for protecting encrypted files transmitted over a network" inventor Ryan, Sep. 11, 2002, 33 pgs.

U.S. Appl. No. 10/642,041, entitled "Method and system for fault-tolerant transfer of files across a network" inventor Kenrich, Aug. 15, 2003, 32 pgs.

U.S. Appl. No. 10/610,832, entitled "Method and system for enabling users of a group shared across multiple file security systems to access secured files" inventor Ryan, Jun. 30, 2003, 33 pgs.

U.S. Appl. No. 10/448,806, entitled "Method and System for Using Remote Headers to Secure Electronic Files" inventor Ryan, May 30, 2003, 35 pgs.

U.S. Appl. No. 10/074,194, entitled "Methods for idnetifying compunds that inhibit or reduce PTP1B expressions" inventor Rondinone, Feb. 12, 2002, 69 pgs.

U.S. Appl. No. 10/074,804, entitled "Secured Data Format for Access Control," inventor Garcia, Feb. 12, 2002, 108 pgs.

U.S. Appl. No. 10/075,194, entitled "System and Method for Providing Multi-location Access Management to Secured Items," inventor Vainstein et al., Feb. 12, 2002, 110 pgs.

U.S. Appl. No. 10/074,996, entitled "Method and Apparatus for Securing Electronic Data," inventor Lee et al., Feb. 12, 2002, 111 pgs.

U.S. Appl. No. 10/074,825, entitled "Method and Apparatus for Accessing Secured Electronic Data Off-line," inventor Lee et al., Feb. 12, 2002, 108 pgs.

U.S. Appl. No. 10/105,532, entitled "System and Method for Providing Different Levels of Key Security for Controlling Access to Secured Items," inventor Hildebrand et al., Mar. 20, 2002, 86 pgs.

U.S. Appl. No. 10/201,756, entitled "Managing Secured Files in Designated Locations," inventor Alain, Jul. 22, 2002, 121 pgs.

U.S. Appl. No. 10/206,737, entitled "Method and System for Updating Keys in a Distributed Security System," inventor Hildebrand, Jul. 26, 2002, 60 pgs.

U.S. Appl. No. 10/246,079, entitled "Security System for Generating Keys from Access rules in a Decentralized Manner and Methods Therefor," inventor Hildebrand, Sep. 17, 2002, 78 pgs.

U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Methods and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Microsoft Press Computer Dictionary, 1997, Microsoft Press, Third Edition, p. 426.

Search Report, completion date May 8, 2003, for European Patent Application No. EP 02 25 8530, 2 pages.

Search Report, completion date Oct. 2, 2003, for European Patent Application No. EP 02 25 8531, 2 pages.

Search Report, completion date Apr. 14, 2005, for European Patent Application No. EP 02 25 8533, 2 pages.

Search Report, completion date Mar. 16, 2005, for European Patent Application No. EP 02 25 8534, 2 pages.

Search Report, completion date Mar. 2, 2005, for European Patent Application No. EP 02 25 8535, 2 pages.

Search Report, completion date Mar. 3, 2005, for European Patent Application No. EP 02 25 8537, 2 pages.

Search Report, completion date May 12, 2005, for European Patent Application No. EP 0225 8539, 2 pages.

Search Report, completion date Jul. 6, 2005, for European Patent Application No. EP 02 25 8529, 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

* cited by examiner

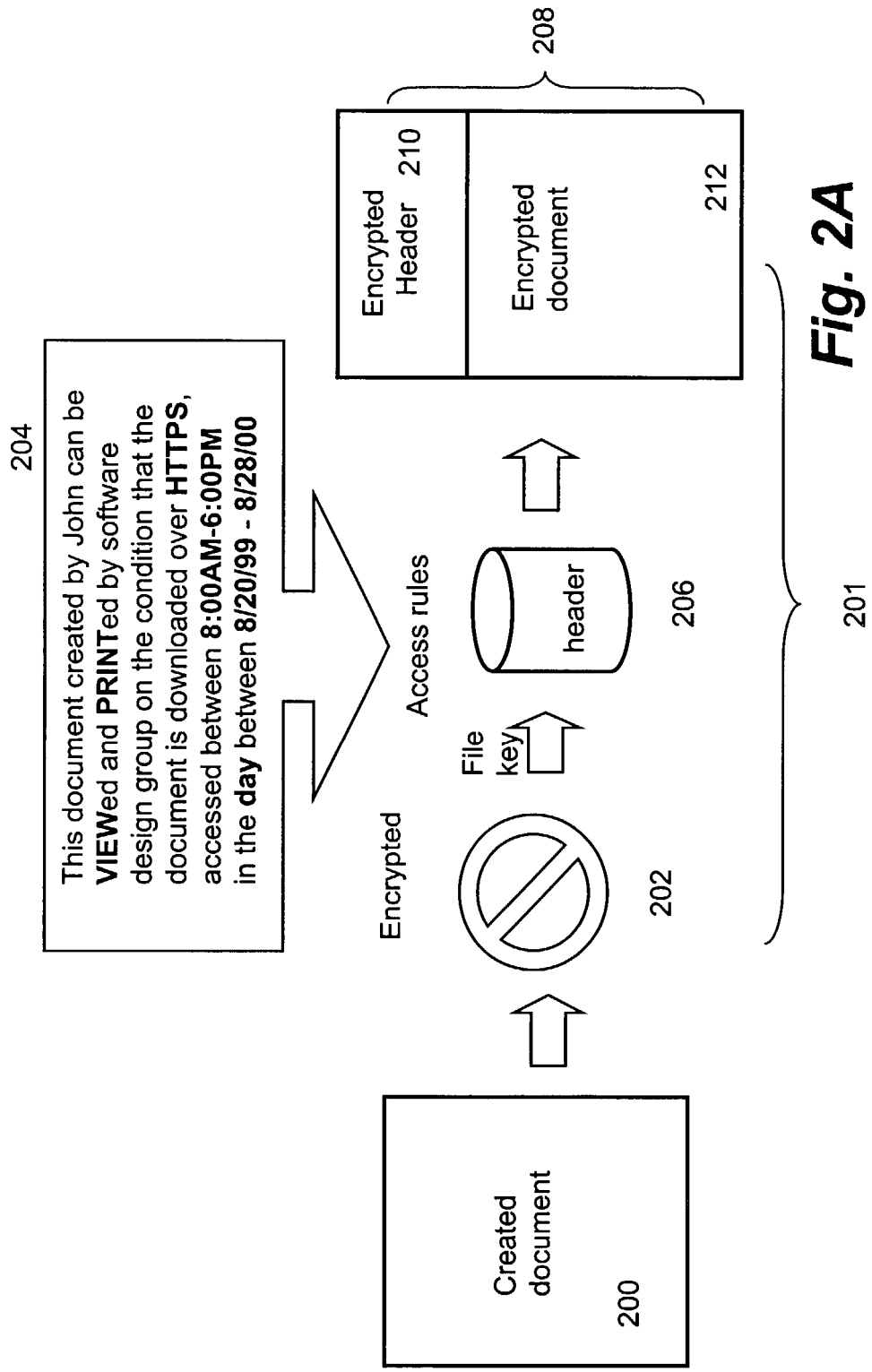

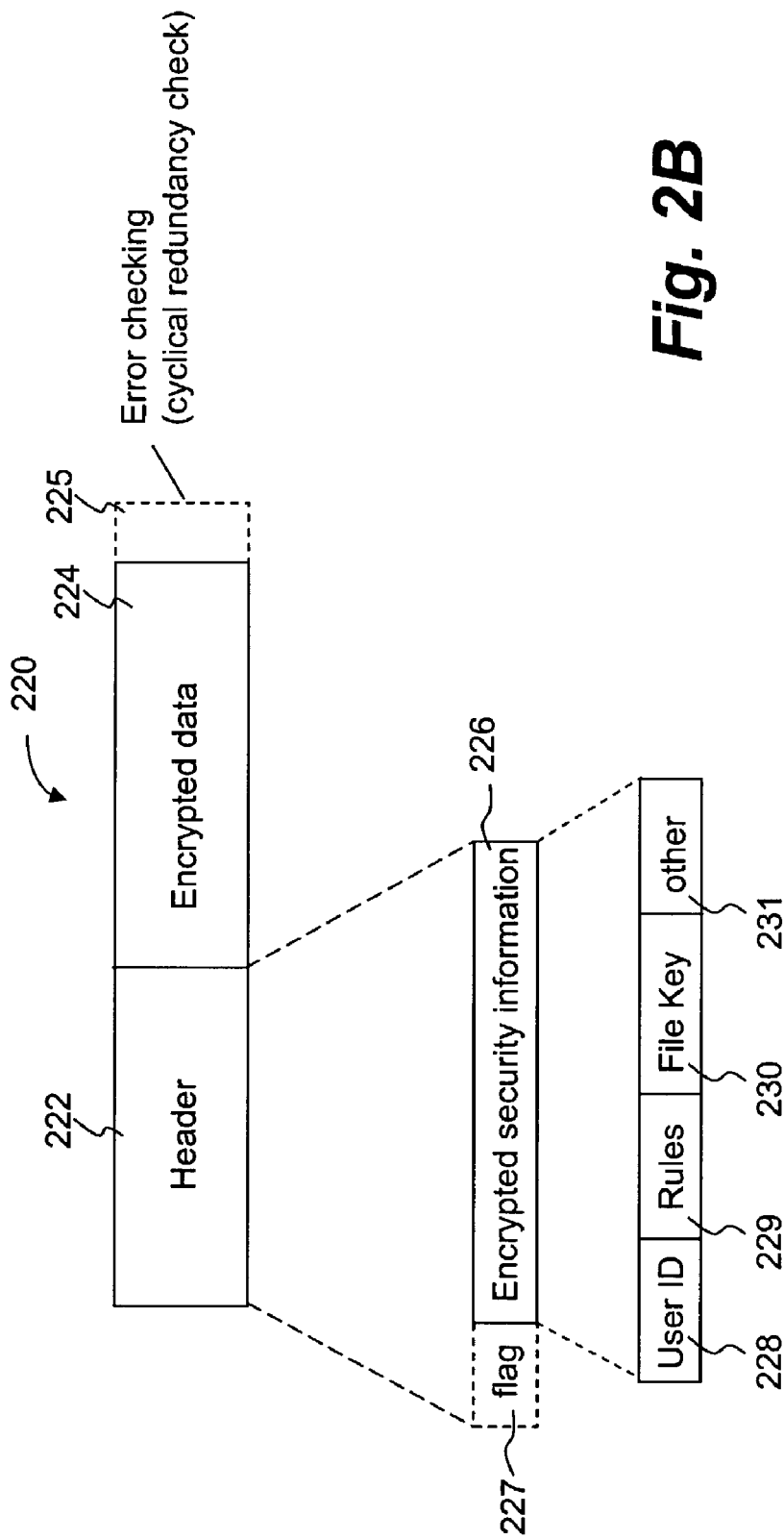

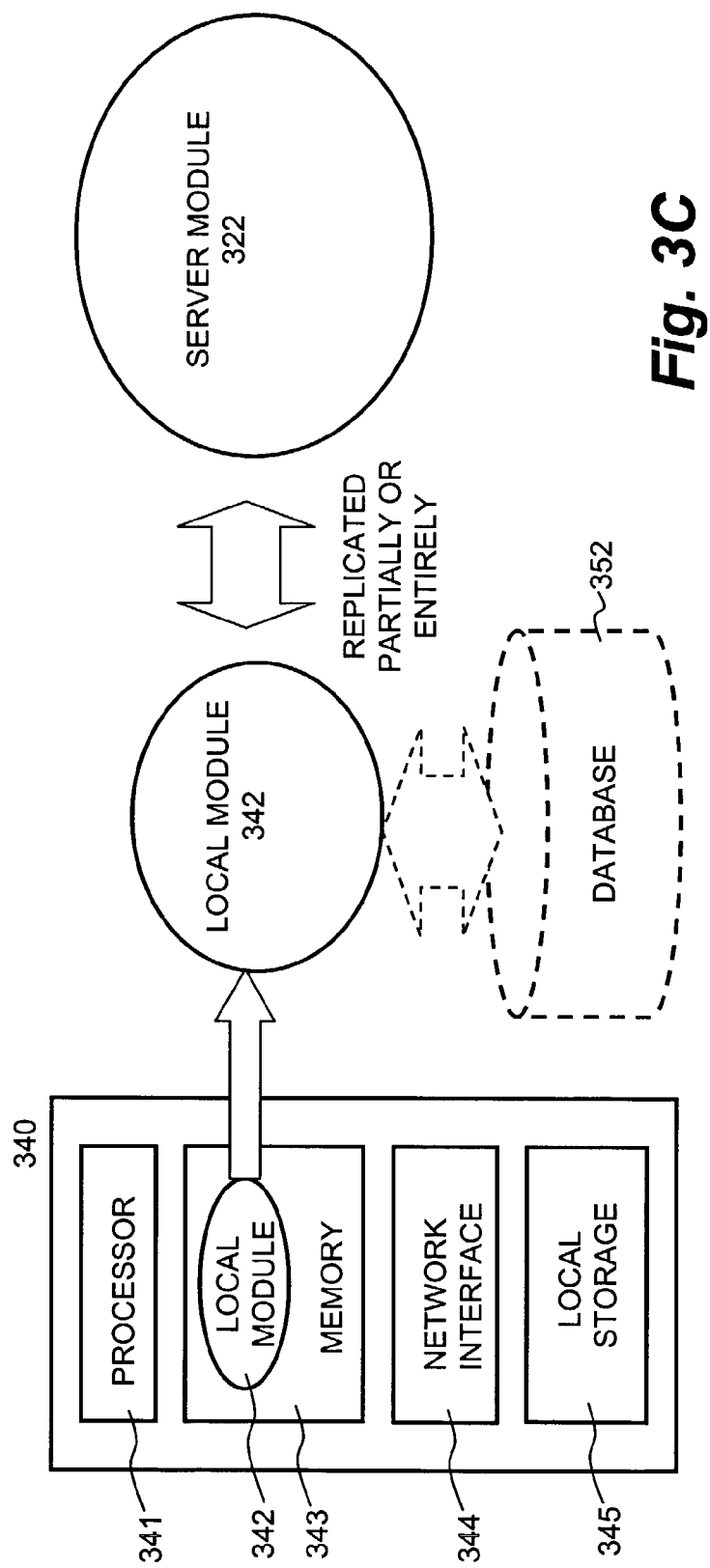

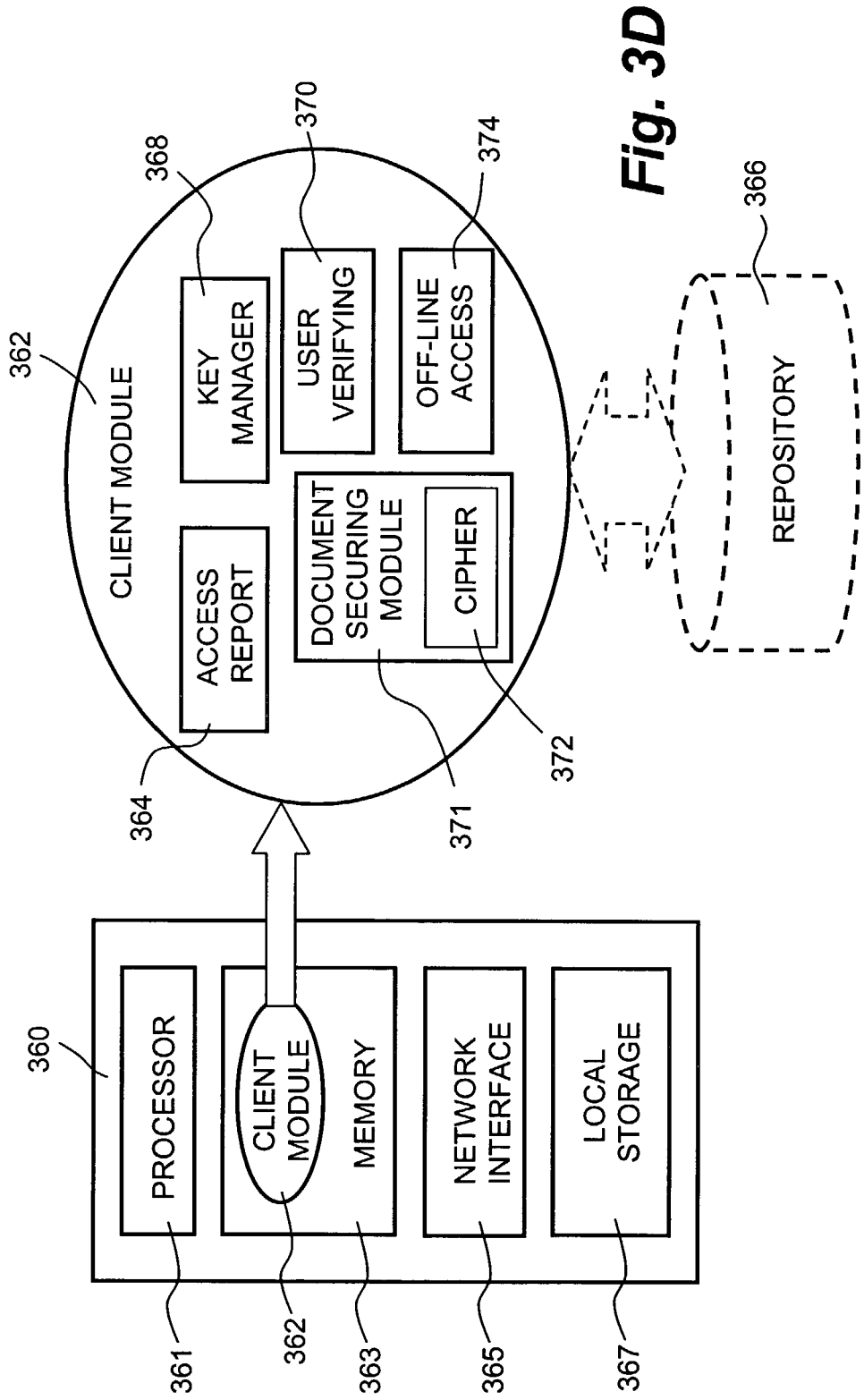

METHOD AND SYSTEM FOR IMPLEMENTING CHANGES TO SECURITY POLICIES IN A DISTRIBUTED SECURITY SYSTEM

CROSS-REFERENCE TO RELATED APPLICATIONS

This application is a continuation-in-part application of U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes. This application also claims the benefits of U.S. Provisional Application No. 60/339,634, filed Dec. 12, 2001, and entitled "PERVASIVE SECURITY SYSTEMS," which is hereby incorporated by reference for all purposes.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected.

Besides the difficulty in protecting resources on networks, security systems have transparently imposed security on documents while also permitting authorized parties to utilize the files as if there were no security. These security systems, however, are not robust systems capable of efficiently and reliably permitting changes to security criteria, which is particularly challenging with security systems operating in networked environments. Therefore, there is a need to provide more effective ways for security systems to secure and protect resources.

SUMMARY OF THE INVENTION

The invention relates to improved approaches for effectuating and communicating changes to security policies (or rules) in a distributed security system. The changes to security policies are distributed in a controlled manner to those users in the security system that are affected. As used herein, a user may mean a human user, a software agent, a group of users, a member of the group, a device and/or application. Besides a human user who needs to access a secured document, a software application or agent sometimes needs to access secured files in order to proceed forward. Accordingly, unless specifically stated, the "user" as used herein does not necessarily pertain to a human being. The distribution of such changes to security policies can be deferred for those affected users that are not activated (e.g., logged-in or on-line) with the security system.

The invention can be implemented in numerous ways, including as a method, system, device, and computer readable medium. Several embodiments of the invention are discussed below.

As a method for distributing a security policy change within a security system distributed over a computer network, the computer network having at least a server machine and a plurality of user computers, one embodiment of the invention includes at lest the acts of: receiving a security policy change at a server machine of the computer network; determining those one or more users that are affected by the security policy change; preparing a security policy message for the one or more users that are determined to be affected by the security policy change; and delivering the one or more security policy change messages to the user computers associated with the affected users.

As a security system for securing files from unauthorized access within a distributed computer network, one embodiment of the invention includes at least: a central server module operating on a central server; a local server module operating on a local server; and a plurality of client modules operating on user computers. The central server module stores security policy information that governs the type and extent of access to the secured files that are permitted by users via the user computers. The local server module receives at least a portion of the security policy information from the central server module. The client modules receive some or all of the portion of the security policy information from the local server module.

As a computer readable medium including at least computer program code for distributing a security policy change within a security system distributed over a computer network, the computer network having at least a server machine and a plurality of user computers, one embodiment of the invention includes at least computer program code for receiving a security policy change at a server machine of the computer network; computer program code for determining those one or more users that are affected by the security policy change; computer program code for preparing a security policy message for the one or more users that are determined to be affected by the security policy change; and computer program code for delivering the one or more security policy change messages to the user computers associated with the affected users.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings wherein:

FIG. 2A is a block diagram of securing a created document according to one embodiment.

FIG. 2B is a diagram of a representative data structure for a secured file according to one embodiment.

FIG. 3C shows a functional block diagram of a local server device according to one embodiment.

FIG. 3D shows a functional block diagram of a client machine according to one embodiment.

DETAILED DESCRIPTION OF THE INVENTION

Figure 1A:
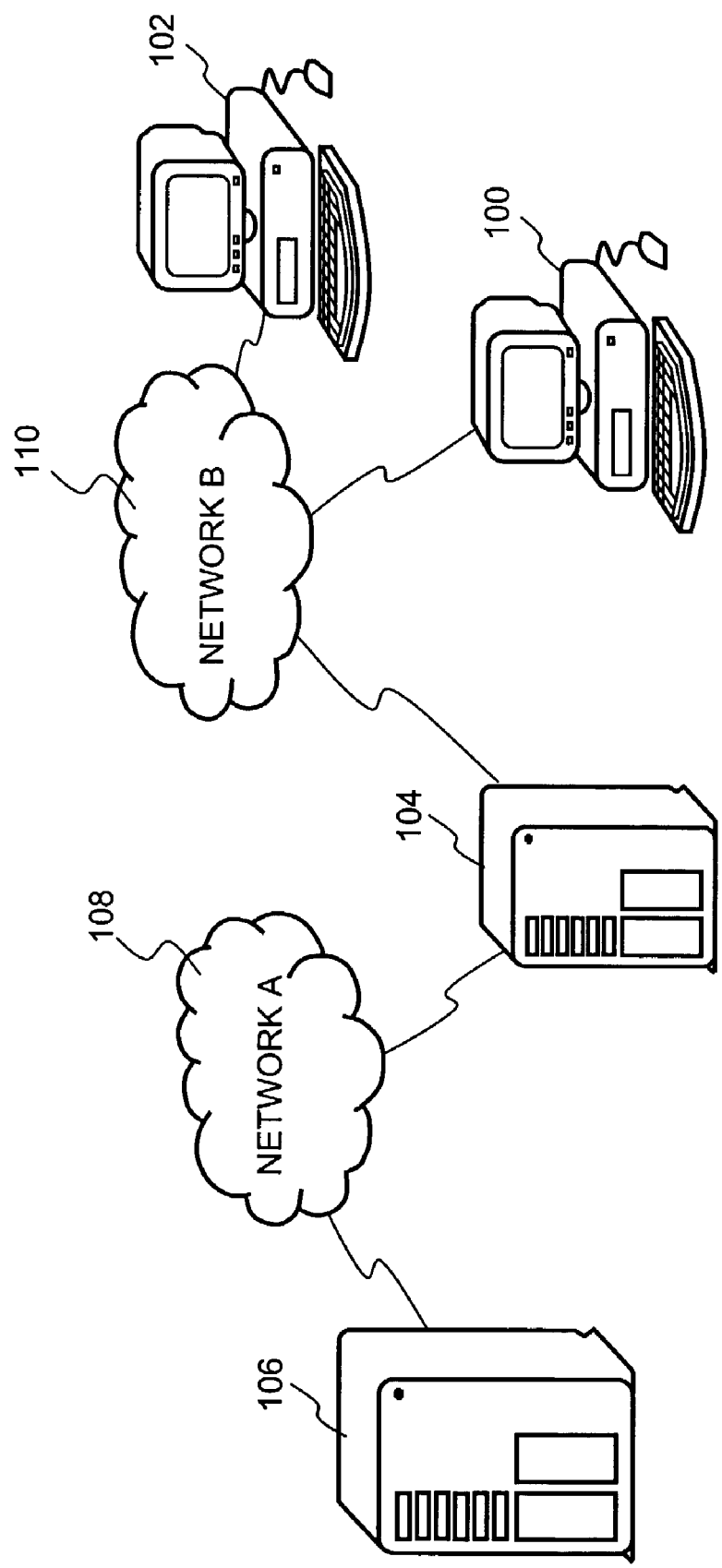
FIG. 1A shows a basic system configuration in which the invention may be practiced in accordance with an embodiment thereof.

The present invention relates to improved approaches for effectuating and delivering changes to security policies in a distributed security system. The changes to security policies are distributed to those users in the security system that are affected. As used herein, the user may mean a human user, a software agent, a group of users, a device and/or application(s). Besides a human user who needs to access a secured document, a software application or agent sometimes needs to access the secured document in order to proceed forward. Accordingly, unless specifically stated, the "user" as used herein does not necessarily pertain to a human being. The distribution of such changes to security policies can be deferred for those affected users that are not activated (e.g., logged-in or on-line) with the security system.

The present invention is related to processes, systems, architectures and software products for providing pervasive security to digital assets. The present invention is particularly suitable in an enterprise environment. In general, pervasive security means that digital assets are secured (i.e., secured items) and can only be accessed by authenticated users with appropriate access rights or privileges. Digital assets may include, but not be limited to, various types of documents, multimedia files, data, executable code, images and texts.

In general, a secured file can only be accessed by authenticated users with appropriate access rights or privileges. Each secured file is provided with a header portion and a data portion, where the header portion contains, or points to, security information. The security information is used to determine whether access to associated data portions of secured files is permitted.

Secured files are files that require one or more keys, passwords, access privileges, etc. to gain access to their content. The security is often provided through encryption and access rules. The files, for example, can pertain to documents, multimedia files, data, executable code, images and text.

In the following description, numerous specific details are set forth in order to provide a thorough understanding of the present invention. However, it will become obvious to those skilled in the art that the present invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-7. However, those skilled in the art will readily appreciate that the detailed description given herein with respect to these figures is for explanatory purposes as the invention extends beyond these limited embodiments.

FIG. 1A shows a basic system configuration in which the present invention may be practiced in accordance with one embodiment thereof. Documents or files may be created using an authoring tool executed on a client computer 100, which may be a desktop computing device, a laptop computer, or a mobile computing device. Exemplary authoring tools may include application programs such as Microsoft Office (e.g., Microsoft Word, Microsoft PowerPoint, and Microsoft Excel), Adobe FrameMaker and Adobe Photoshop.

According to one embodiment, the client computer 100 is loaded with a client module that is capable of communicating with a server 104 or 106 over a data network (e.g., the Internet or a local area network). According to another embodiment, the client computer 100 is coupled to the server 104 through a private link. As will be further explained below, a document or file created by an authoring tool can be secured by the client module. The client module, when executed, is configured to ensure that a secured document is secured at all times in a store (e.g., a hard disk or other data repository). The secured documents can only be accessed by users with proper access privileges. In general, an access privilege or access privileges for a user may include, but not be limited to, a viewing permit, a copying permit, a printing permit, an editing permit, a transferring permit, an uploading/downloading permit, and a location permit.

According to one embodiment, a created document is caused to go through an encryption process that is preferably transparent to a user. In other words, the created document is encrypted or decrypted under the authoring application so that the user is not aware of the process. A key (referred to herein as a user key) can be used to retrieve a file key to decrypt an encrypted document. Typically, the user key is associated with an access privilege for the user or a group of users. For a given secured document, only a user with a proper access privilege can access the secured document.

In one setting, a secured document may be uploaded via the network 110 from the computer 100 to a computing or storage device 102 that may serve as a central repository. Although not necessary, the network 110 can provide a private link between the computer 100 and the computing or storage device 102. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computer 100 may be remotely accessed.

In another setting, the computer 100 and the computing or storage device 102 are inseparable, in which case the computing or storage device 102 may be a local store to retain secured documents or receive secured network resources (e.g., dynamic Web contents, results of a database query, or a live multimedia feed). Regardless of where the secured documents or secured resources are actually located, a user, with proper access privilege, can access the secured documents or resources from the computer 100 or the computing or storage device 102 using an application (e.g., Internet Explorer, Microsoft Word or Acrobat Reader).

The server 104, also referred to as a local server, is a computing device coupled between a network 108 and the network 110. According to one embodiment, the server 104 executes a local version of a server module. The local version is a localized server module configured to service a group of designated users or client computers, or a location. Another server 106, also referred to as a central server, is a computing device coupled to the network 108. The server 106 executes the server module and provides centralized access control management for an entire organization or business. Accordingly, respective local modules in local servers, in coordination with the central server, form a distributed mechanism to provide distributed access control management. Such distributed access control management ensures the dependability, reliability and scalability of centralized access control management undertaken by the central server for an entire enterprise or a business location.

Figure 1B:
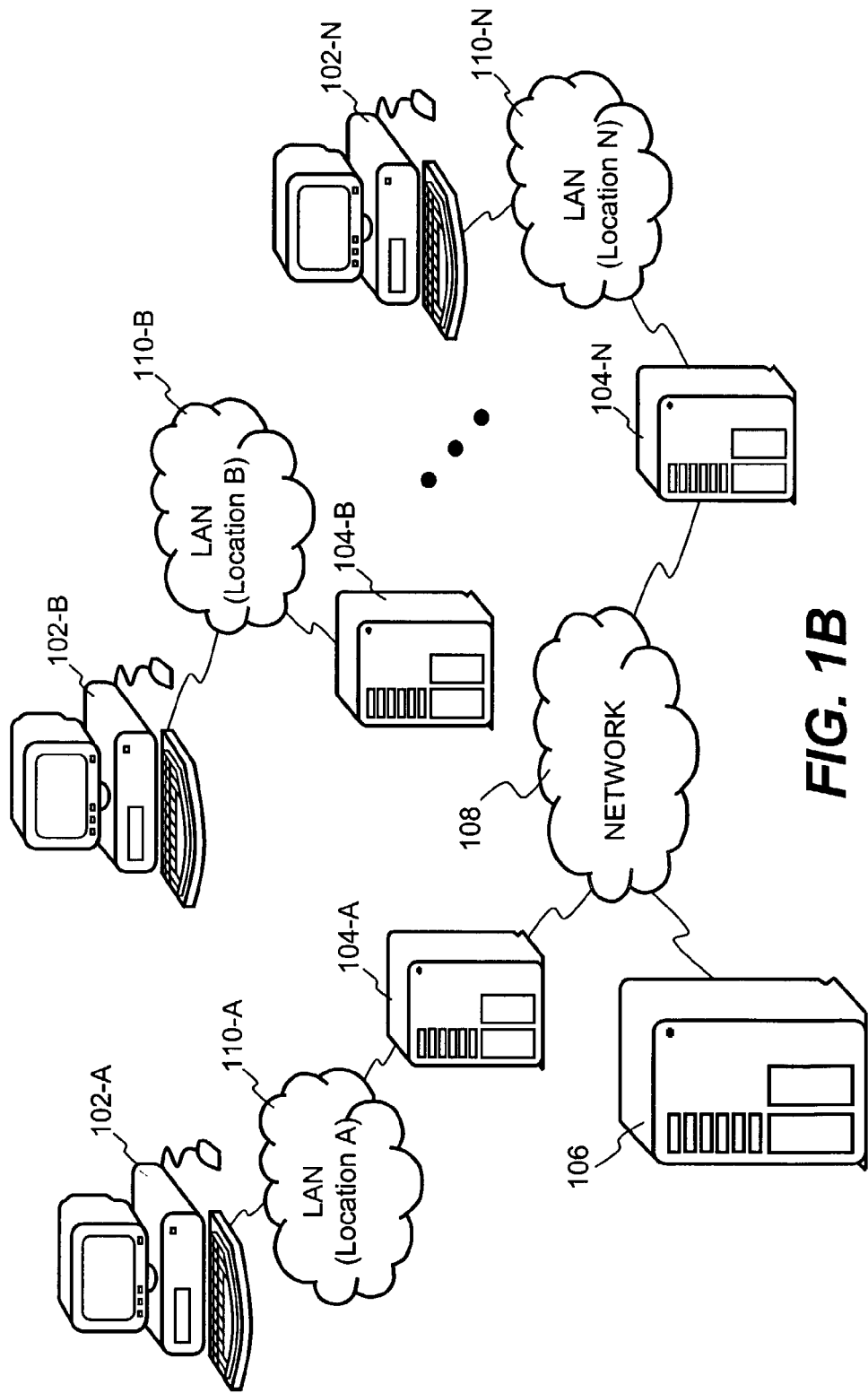
FIG. 1B shows another system configuration in which the invention may be practiced in accordance with an embodiment thereof.

FIG. 1B shows a configuration in which a central server and local servers are employed. The configuration may correspond to a large enterprise having multiple geographic locations or offices. A central server 106 maintains a database managing the access privileges and the access rules in the entire enterprise. One of the features in this configuration is the underlying capability to provide fault tolerance and efficient AC (Access Control) management for a large group of users. Instead of having the central server 106 performing the AC management for each of the users at one single location, a number of local servers 104 (e.g., 104-A, 104-B, . . . and 104-N) are employed in a distributed manner to service the individual locations or offices. Each of local servers 104 executes a local module derived or duplicated from the server module being executed at the central server 106 to manage those users who are local to respective local servers 104. The central server 106 can centralize the AC management in addition to managing the users if necessary.

According to one embodiment, a local module can be a customized version of the server module that runs efficiently for only a few locations or a group of users. For example, a local server 104-A is only responsible for the users or computers 102-A in location A, while a local server 104-B is only responsible for the users or computers 102-B in location B. As a result, even if the central server 106 has to be taken down for maintenance or is not operative at the time a user needs to access secured documents, the access control will not be disrupted. The detailed operation of the local servers 104 in cooperation with the central server 106 will be further described below.

According to another embodiment, a local module is a replicated version of the server module and exchanges any updates with the server module when connected (e.g., periodically or at request). Depending on implementation, part or all of the server module can be duplicated in a local server to ensure that communications with users or their client machines are efficient and fault tolerance. As a result, even if the central server 106 has to be taken down for maintenance or is not operative at the time a user needs to access secured documents, the access control will not be disruptive. For example, in such a situation, any of the local servers 104 can step up and take the place of the central server. When the central server 106 is running or communicating with the local servers 104, information collected at the respective local servers about the users or their activities is sent back to the central server 106. The detailed operation of the local servers 104 in cooperation with the central server 106 in this regard will also be further provided below.

Figure 1C:
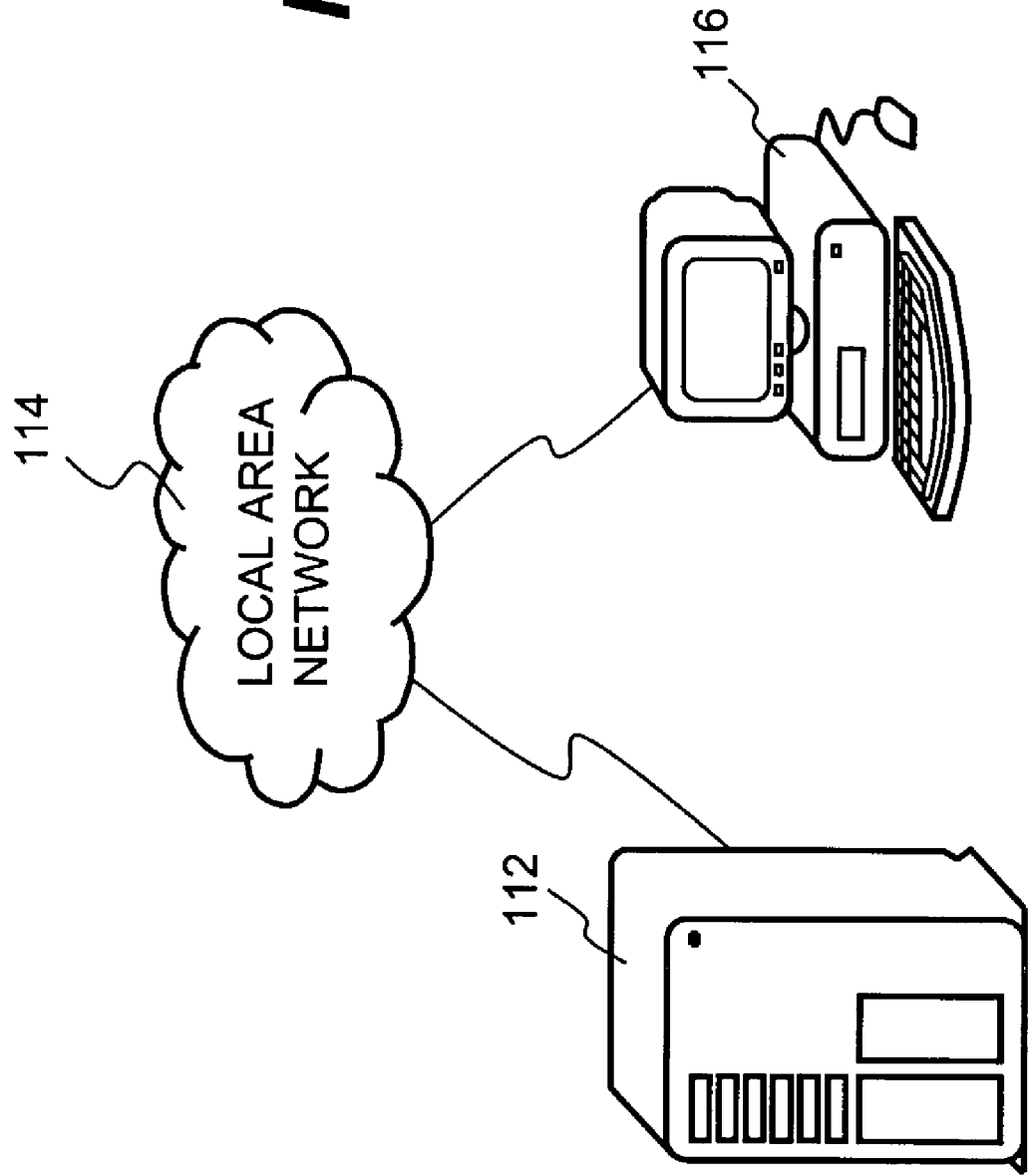
FIG. 1C shows still another system configuration in which the invention may be practiced in accordance with an embodiment thereof.

FIG. 1C shows a configuration suitable for a small group of users. In this configuration, no local servers are employed. A server computer 112 is loaded with the server module and each of the users or terminal computers 116 (only one is shown therein) is loaded with a client module. As a result, the server computer 112 performs the AC management for each of the users or the terminal computers 116.

It should be noted that there is no clear distinction between a small group and a large group of users as far as the number is concerned. Given the description herein, those skilled in the art will understand how to distribute or balance the AC management among one or more other computing devices. To facilitate the following description of the present invention, the setting shown in FIG. 1B will be assumed. Those skilled in the art will understand that the description herein is equally applicable to FIG. 1C or situations in which other possible settings between one or more central servers and one or more local servers are desired.

Figure 1D:
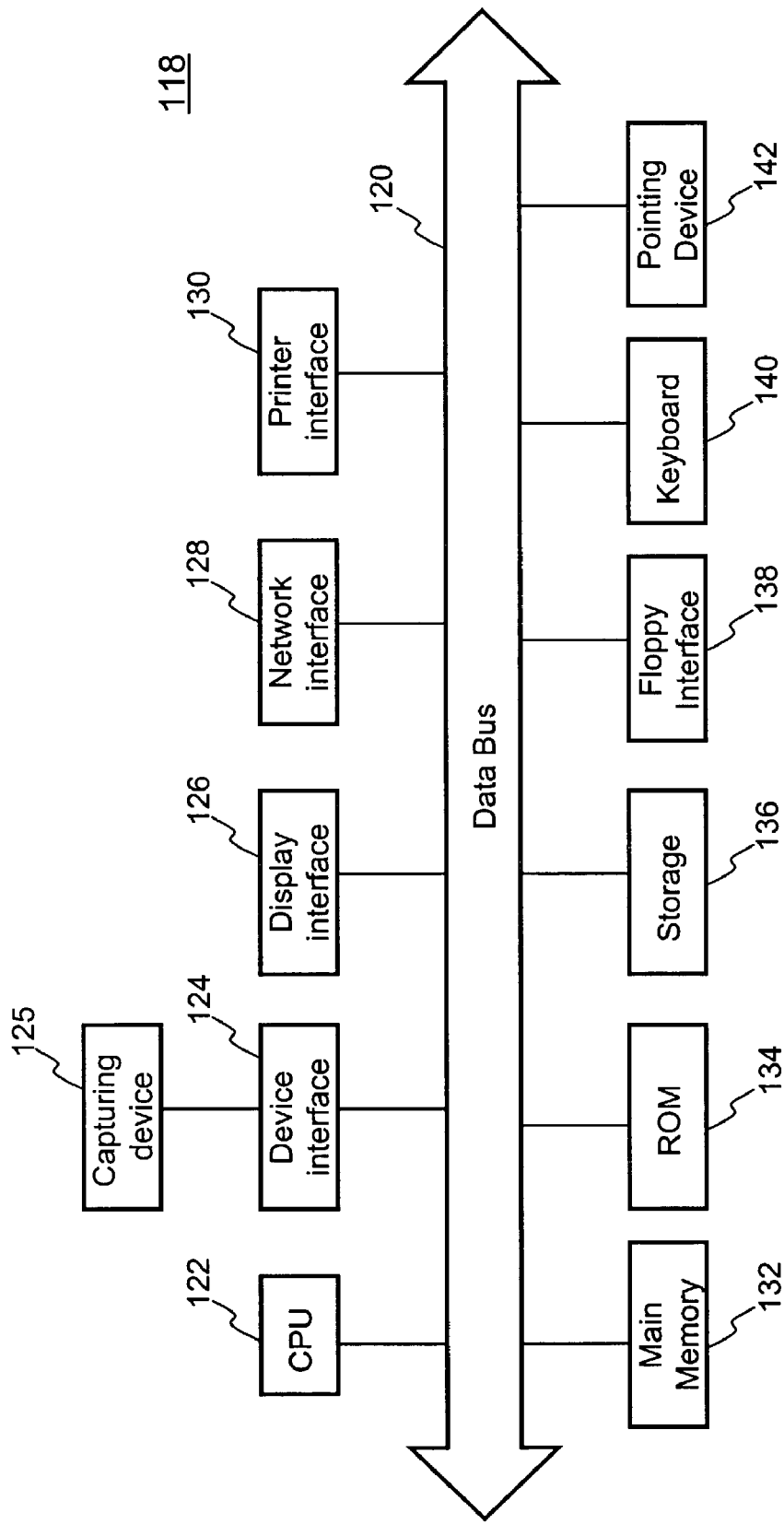
FIG. 1D shows internal construction blocks of a computing device in which the invention may be implemented and executed.

FIG. 1D shows internal construction blocks of a computing device 118 in which one embodiment of the present invention may be implemented and executed. The computing device 118 may correspond to a client device (e.g., computer 100, computing or storage device 102 in FIG. 1A) or a server device (e.g., server 104, 106 in FIG. 1A). As shown in FIG. 1B, the computing device 118 includes a central processing unit (CPU) 122 interfaced to a data bus 120. CPU 122 executes instructions to process data and perhaps manage all devices and interfaces coupled to data bus 120 for synchronized operations. The instructions being executed can, for example, pertain to drivers, operating system, utilities or applications. Device interface 124 may be coupled to an external device, such as the computing device 102 of FIG. 1A; hence, the secured documents there from can be received into memory 132 or storage 136 through data bus 120. Also interfaced to data bus 120 is a display interface 126, a network interface 128, a printer interface 130 and a floppy disk drive interface 138. Generally, a client module, a local module or a server module of an executable version of one embodiment of the present invention can be stored to storage 136 through floppy disk drive interface 138, network interface 128, device interface 124 or other interfaces coupled to data bus 120. Execution of such module by CPU 122 can cause the computing device 118 to perform as desired in the present invention. In one embodiment, the device interface 124 provides an interface for communicating with a capturing device 125 (e.g., a fingerprint sensor, a smart card reader or a voice recorder) to facilitate the authentication of a user of the computing device 118.

Main memory 132, such as random access memory (RAM), is also interfaced to data bus 120 to provide CPU 122 with instructions and access to memory storage 136 for data and other instructions. In particular, when executing stored application program instructions, such as for document securing or document accessing, CPU 122 is caused to manipulate the data to achieve results contemplated by the program instructions. Read-only memory (ROM) 134 is provided for storing executable instructions, such as a basic input/output operation system (BIOS) for operation of keyboard 140, display 126 and pointing device 142 which may be present.

In one embodiment, the computing or storage device 102 is capable of storing secured items (e.g., secured files) in the main memory 132 or the storage 136. The main memory 132 provides non-persistent (i.e., volatile) storage for the secured items and the storage 136 provides persistent (i.e., non-volatile) storage for the secured items. Hence, the computing or storage device 102, or more particularly, the main memory 132 and/or the storage 136 can act as a storage device for the secured items.

Referring now to FIG. 2A, a block diagram of securing a created document 200 is shown according to one embodiment of the invention. For example, the created document 200 is a created file. After the document 200 is created, edited or opened with an application or authoring tool (e.g., Microsoft WORD), upon an activation of a command, such as "Save," "Save As" or "Close", or automatic saving invoked by an operating system, the application itself, or an approved application, the created document 200 is caused to undergo a securing process 201. The securing process 201 starts with an encryption process 202, namely the document 200 that has been created or is being written into a store is encrypted by a cipher (e.g., an encryption process) with a file key (i.e., a cipher key). In other words, the encrypted data portion 212 could not be opened without the file key. For the purpose of controlling the access to the contents in the document 200 or the resultant secured file 208, the file key or keys may be the same or different keys for encryption and decryption and are included as part of security information contained in or pointed to by a header 206. The file key or keys, once obtained, can be used to decrypt the encrypted data portion 212 to reveal the contents therein.

To ensure that only authorized users or members of an authorized group can access the secured file 208, a set of access rules 204 for the document 200 is received or created and associated with the header 206. In general, the access rules 204 determine or regulate who and/or how the document 200, once secured, can be accessed. In some cases, the access rules 204 also determine or regulate when or where the document 200 can be accessed.

In addition, security clearance information 207 can be added to the header 206 if the secured file 208 is classified. In general, the security clearance information 207 is used to determine a level of access privilege or security level of a user who is attempting to access the contents in the secured file 208. For example, a secured file may be classified as "Top secret", "Secret", "Confidential", and "Unclassified". According to one embodiment, the security clearance information 207 includes another layer of encryption of the file key with another key referred to herein as a clearance key. An authorized user must have a clearance key of proper security level in addition to an authenticated user key and proper access privilege to retrieve the file key. As used herein, a user key or a group key is a cipher key associated with an authenticated user and may be used to access a secured file or secure a file, or create a secured file. Additional detail on obtaining such a user key upon a user being authenticated is provided in U.S. patent application Ser. No. 10/074,194.

According to another embodiment, the security clearance information 207 includes a set of special access rules to guard the file key. The retrieval of the file key requires that the user passes an access rule measurement. Since access privilege of a user may be controlled via one or more system parameters (e.g., rules or policies), the access rule measurement can determine if the user has sufficient access privilege to retrieve the file key in conjunction with the corresponding user key.

In accordance with the security clearance information 207, a user may be assigned a hierarchical security clearance level based on, perhaps, a level of trust assigned to the user. A level of trust implies that one user may be more trusted than another and hence the more trusted user may access more classified files. Depending on implementation, a level of trust may be based on job responsibility of the user or a role of the user in a project or an organization background checks, psychological profiles, length of service, etc. In any case, a level of trust assigned to the user augments additional aspect to the access privilege of the user such that the user must have proper security clearance to access a classified secured file even if the user is permitted by the access rules to access the file.

In general, a header is a file structure, preferably small in size, and includes, or perhaps links to, security information about a resultant secured document. Depending on implementation, the security information can be entirely included in a header or pointed to by a pointer that is included in the header. The security information further includes the file key and/or one or more clearance keys, in some cases, an off-line access permit (e.g., in the access rules) should such access be requested by an authorized user. The security information is then encrypted by a cipher (i.e., an en/decryption scheme) with a user key associated with an authorized user to produce encrypted security information 210. The encrypted header 206, if no other information is added thereto, is attached to or integrated with the encrypted data portion 212 to generate the resultant secured file 208. In a preferred embodiment, the header is placed at the beginning of the encrypted document (data portion) to facilitate an early detection of the secured nature of a secured file. One of the advantages of such placement is to enable an access application (i.e., an authoring or viewing tool) to immediately activate a document securing module (to be described where it deems appropriate) to decrypt the header if permitted. Nevertheless, there is no restriction as to where the encrypted header 206 is integrated with the encrypted data portion 212.

It is understood that a cipher may be implemented based on one of many available encryption/decryption schemes. Encryption and decryption generally require the use of some secret information, referred to as a key. For some encryption mechanisms, the same key is used for both encryption and decryption; for other mechanisms, the keys used for encryption and decryption are different. In any case, data can be encrypted with a key according to a predetermined cipher (i.e., encryption/decryption) scheme. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any cipher scheme that is effective and reliable may be used. Hence, the details of a particular scheme are not further discussed herein so as to avoid obscuring aspects of the present invention.

In essence, the secured document 208 includes two parts, the encrypted data portion 212 (i.e., encrypted version of the document itself) and the header 210 that may point to or include encrypted security information for the secured document 208. To access the contents in the encrypted data portion 212, one needs to obtain the file key to decrypt the encrypted data portion 212. To obtain the file key, one needs to be authenticated to get a user or group key and pass an access test in which at least the access rules in the security information are measured against the user's access privilege (i.e., access rights). If the secured file is classified, it further requires a security level clearance on the user. In general, the security clearance level of the user must be high enough before the file key can be retrieved.

To facilitate the description of the present invention, it is assumed in the following that the secured item is not classified. Those skilled in the art can appreciate that the decryption in the following can be equally applied to secured items that are classified.

It should be noted that the header in a secured document may be configured differently than noted above without departing from the principles of the present invention. For example, a secured document may include a header with a plurality of encrypted headers, each can be accessible only by one designated user or a group users. Alternatively, a header in a secured document may include more than one set of security information or pointers thereto, each set being for one designated user or a group of users while a single file key can be used by all. Some or all of the access rules may be viewed or updated by users who can access the secured document.

As will be further described below, to access a secured document (or a secured file), a user needs a user key or keys to decrypt the encrypted security information or at least a portion of the header first. In one embodiment, the key or keys are associated with a user's login to a local server or a central server. Appropriate access privileges associated with the user are validated if the user has been authenticated or previously registered with the server and properly logged in. Depending on the permission or the access privileges, the access rules for the secured document determine whether the contents of the document shall be revealed to the user.

According to one embodiment, the access rules are present in a descriptive language such as text or a markup language (e.g., HTML, SGML and XML). In a preferred embodiment, the markup language is Extensible Access Control Markup Language (XACML) that is essentially an XML specification for expressing policies for information access. In general, XACML can address fine-grained control of authorized activities, the effect of characteristics of the access requestor, the protocol over which the request is made, authorization based on classes of activities, and content introspection (i.e., authorization based on both the requestor and attribute values within the target where the values of the attributes may not be known to the policy writer). In addition, XACML can suggest a policy authorization model to guide implementers of the authorization mechanism.

In general, the data portion of a secured item is a document or file encrypted with a cipher (e.g., a symmetric or asymmetric encryption scheme). Encryption is the transformation of data into a form that is impossible to read without appropriate knowledge (e.g., a key). Its purpose is to ensure privacy by keeping information hidden from anyone to whom it is not intended, even those who have access to other encrypted data. Decryption is the reverse of encryption. Encryption and decryption generally require the use of some secret information, referred to as a key. For some encryption mechanisms, the same key is used for both encryption and decryption; for other mechanisms, the keys used for encryption and decryption are different.

For the purpose of controlling the access to the document, the key or keys, referred collectively to as a file key, may be the same or different keys for encryption and decryption and are preferably included in the security information contained in, or pointed to by, the header and, once obtained, can be used to decrypt the encrypted document. To ensure that the key is not to be retrieved or accessible by anyone, the key itself is guarded by the access privileges and rules. If a user requesting the document has the proper access privileges that can be granted by the access rules and system policies if there are any, the key will be retrieved to proceed with the decryption of the encrypted document.

To ensure that the security information or the header is not readily revealed, at least a portion of the header itself can be encrypted with a cipher. Depending on an exact implementation, the cipher for the header may or may not be identical to the one used for the document. The key (referred to as a user key) to decrypt the encrypted header can, for example, be stored in a local store of a terminal device and activated only when the user associated with it is authenticated. As a result, only an authorized user can access the secured document. Optionally, the two portions (i.e., the header (possibly encrypted) and the encrypted document) can be encrypted again and only decrypted by a user key. In another option, the encrypted portions (either one or all) can be error-checked by an error-checking portion, such as using a cyclical redundancy check to ensure that no errors have been incurred to the encrypted portion(s) of the secured document.

FIG. 2B is a diagram of a representative data structure 220 for a secured file according to one embodiment. For example, the secured file can be the secured document 208 illustrated in FIG. 2A. The data structure 220 includes a header (or header portion) 222 and an encrypted data (or encrypted data portion) 224. The data structure 220 may also include an error-checking portion 225 that stores one or more error-checking codes, for example, a separate error-checking code for each block of data. For example, these error-checking codes can be associated with a Cyclical Redundancy Check (CRC) for the header 222 and/or the encrypted data. The header 222 includes a flag bit 227 and encrypted security information 226. The flag bit 227 indicates whether or not the data structure pertains to a file that is secured. The security information 226 can vary depending upon implementation. However, as shown in FIG. 2B, the security information 226 includes a user identifier (ID) 228, rules (access rules) 229, a file key 230 and other 231. The other 231 is additional space for other information to be stored within the security information 226. For example, the other information 231 may be used to include other information facilitating secure access to the secured file, such as version number or author identifier. The file key 230 is used to decrypt the encrypted data portion 214 so as to access the content or data of the secured file.

In an alternative data structure for a secured file, the header can include at least one pointer which points to a remote data structure stored in a storage device. The remote data structure can store some or all of the security information, thereby shortening the size of the header and improving manageability of security information. The storage device is typically a local storage device. In other words, the alternative data structure and the remote data structure are typically stored on a common machine (e.g., desktop or portable computer). The data structure 292 stores security information 294. Additional details on the alternative data structure can be found in U.S. application Ser. No. 10/132,712, filed Apr. 26, 2002, and entitled "METHOD AND SYSTEM FOR PROVIDING MANAGEABILITY TO SECURITY INFORMATION FOR SECURED ITEMS," which is hereby incorporated herein by reference.

Figure 2C:
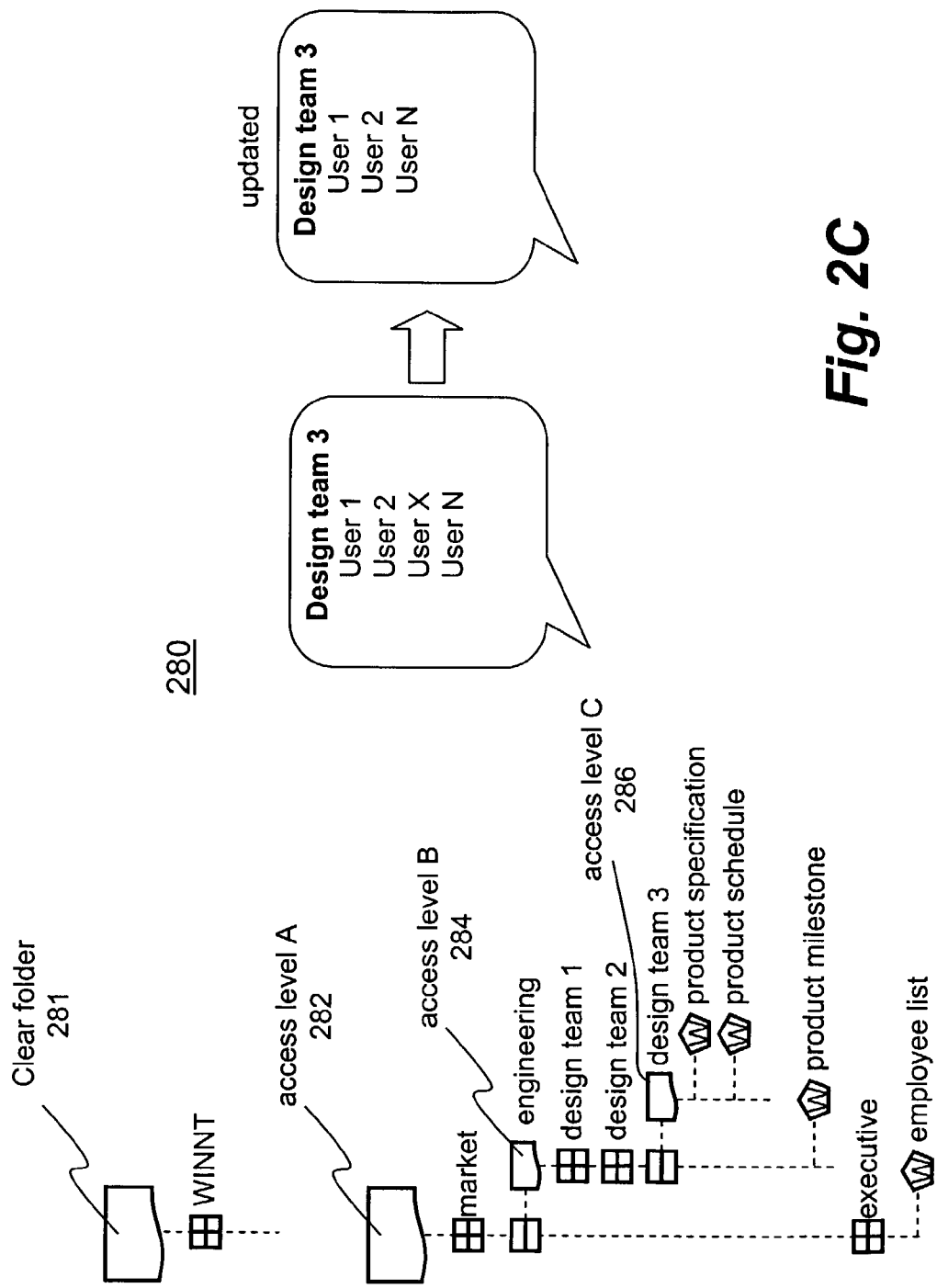
FIG. 2C is a diagram of a representative directory structure including a clear folder and a secured folder according to one embodiment.

One advantage of setting up a set of access rules for a particular place or folder is to provide a securing mechanism for users to create secured documents without specifying as to who/how/when/where the documents can be accessed. Folders are commonly available with operating systems utilized with computers (e.g., servers and user computers). FIG. 2C shows a directory structure 280 including a clear folder 281 and a secured folder 282. The clear folder 281 is generally for storing system files or files that are not intended to be protected (secured). The secured folder 282 can include multiple subfolders that can be structured respectively for each different access level. For example, a document "employee list" can be accessed by anyone who has access privilege to access level A. Similarly, documents "product milestone" can be accessed by anyone who has access privilege to access level B, and "product specification" or "product schedule" can be accessed by anyone who has access privilege to access level C, respectively. Likewise, a created document, if placed in folder "design team 2", will be automatically encrypted with the corresponding access rules that will permit only those who has access privileges to access level B. In this embodiment the access levels are hierarchical, meaning that a user with access level A authorization can access not only access A items but also the lower access levels B and C which are subsets of access level A. Similarly, the access level C is a subset of the access level B. Consequently, the access level A is a high access level, the access level B is an intermediate access level, and the access level C is a low access level.

Further, once a folder has been assigned, its access level or the access privileges needed by users to access the folder may change. For example, initially the folder 286 has an access level C and is associated with an authorized group known as "design team 3." A policy change may occur that causes the users within the "design team 3" to change. In the example shown in FIG. 2C, the group "design team 3" initially includes users 1, 2, X and N. However, a modification to the group occurs such that the group "design team 3" subsequently includes users 1, 2 and N, noting that user X has been removed from the group. Hence, unless user X was moved up to access levels A or B, user X is no longer permitted access to the documents in the folder 286.

In real applications, various types of policy or updates changes are possible. The policy changes can affect system policies, access rules, various keys, groups or users. Some examples of policy changes include: (i) changes to group membership; (ii) addition, removal or modification to document access rules; (iii) changes to user keys; and (iv) addition, removal or modification to group access rights. In any case, once a policy change occurs, the policy change must be carried out by the security system in a reliable fashion without affecting others that are not subject to the change. The processing detailed below explains how policy changes are effectuated.

Figure 3A:
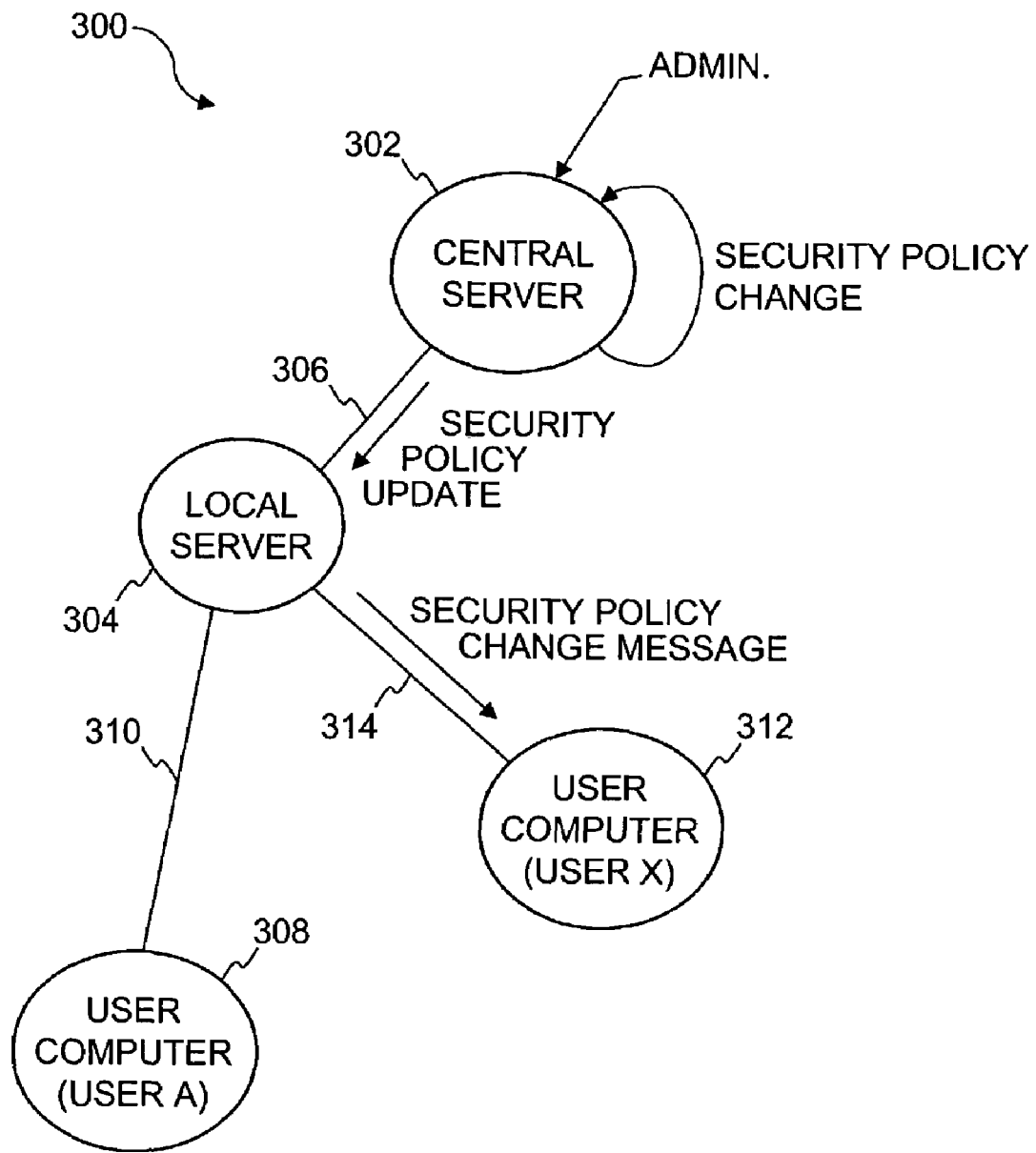
FIG. 3A is a diagram of a security system according to one embodiment of the invention.

FIG. 3A is a diagram of a security system 300 according to one embodiment of the invention. The security system 300 operates to restrict access and/or usage to items (e.g., files, documents, etc.) residing within a computer network. By restricting access and/or usage of items, the items are secured or protected from unauthorized access or usage.

The security system 300 includes a central server 302. The central server 302 couples to a local server 304 through a link 306. The local server 304 couples to a user computer 308 over a link 310 and couples to a user computer 312 over a link 314. The central server 302 is a computer that performs centralized access control management or security processing for the security system 300. The local server 304 performs semi-centralized security processing for the security system 300. The user computers 308 and 312 perform localized security processing. The links 306, 310 and 314 can be provided by a network infrastructure which may utilize wired and/or wireless components.

In general, the security system 300 provides security to items in accordance with security policies. The security policies govern the nature and extent to which security is provided for the items. One representative operation of a security system 300 pertains to implementing changes to security policies and is as follows. An administrator interacts with the central server 302 to implement a change to the security policies being maintained by the security system 300. In this regard, the administrator would request that a security policy change be implemented for the security system 300. After the security policy change has been requested by the administrator, the central server 302 would inform the local server 304 of the security policy change. In one embodiment, the central server 302 would inform the local server 304 of the security policy change by sending a security policy update from the central server 302 to the local server 304 over the link 306. The local server 304 can then send a security policy change message to those of the user computers 308, 312 within the security system 300 that are affected by the security policy change. As illustrated in FIG. 3, the local server 304 sends a security policy change message to the user computer 312 over the link 314. Here, it is assumed that User X, whom is using the user computer 312, is affected by the security policy change. Hence, the local server 304 informs the user computer 312 of the security policy change by sending the security policy change message to the user computer 312. It should be noted that the local server 304 does not provide a security policy change message to the user computer 308 because its user, User A, is not affected by the security policy change.

Although the security system 300 is shown as including the central server 302 and the local server 304, it should be understood that the security system 300 can be implemented in a variety of different ways. For example, the security system according to the invention need not include any local servers. Alternatively, the security system could use a plurality of local servers. In any case, each server (e.g., a central server or a local server) is able to support one or more users and/or computers.

The security system according to the invention can, in general, include or make use of one to many user computers and at least one central server. The security system can also include or make use of one or more local servers as desired. In other words, the security systems operate in a distributed fashion. Nevertheless, according to the invention, security policy changes are able to be reliably effectuated in such distributed systems.

Figure 3B:
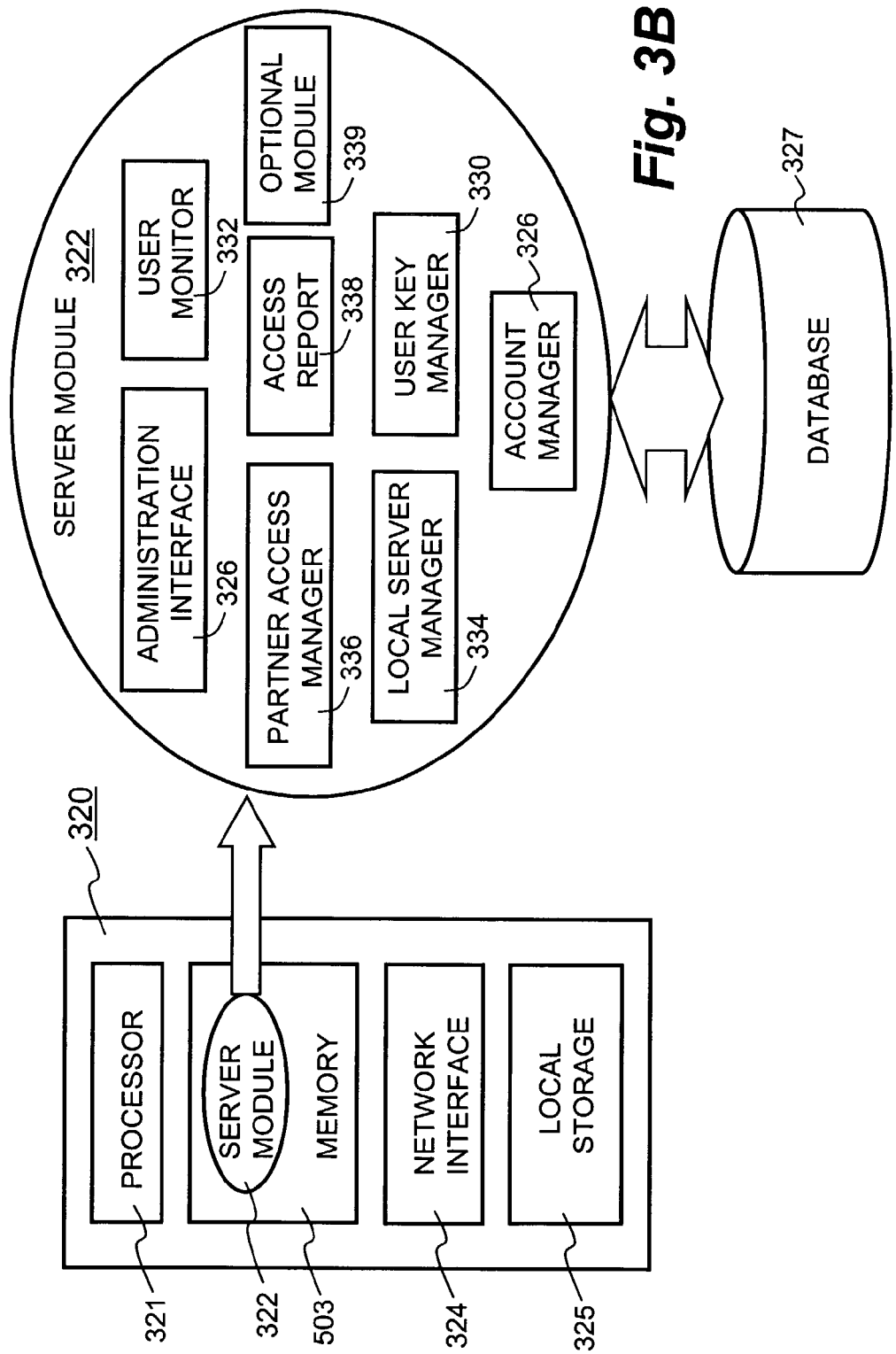
FIG. 3B shows a functional block diagram of a server device according to one embodiment.

Referring now to FIG. 3B, there is shown a functional block diagram of a server device 320 in which a server module 322 resides in a memory space 323 and is executable by one or more processors 321. The server device 320 also includes a network interface 324 to facilitate the communication between the server 320 and other devices on a network and a local storage space 325. The server module 322 is an executable version of one embodiment of the present invention and delivers, when executed, features/results contemplated in the present invention. According to one embodiment, the server module 322 comprises an administration interface 326, an account manager 328, a system parameter manager 330, a user monitor 332, a local server manager 334, a partner access manager 336, an access report manager 338, and a rules manager 339.

Administration Interface 326:

As the name suggests, the administration interface 326 facilitates a system administrator to register users and grant respective access privileges to the users and is an entry point to the server module from which all sub-modules or the results thereof can be initiated, updated and managed. In one embodiment, the system administrator sets up hierarchy access levels for various active folders, storage locations, users or group of users. The privileges may include, but not be limited to: open, edit write, print, copy, download and others. Examples of the other privileges are: altering access privileges for other users, accessing secured documents from one or more locations, and setting up a set of access rules for a folder different from those previously set up (perhaps by the system administrator). The respective user IDs assigned to the users facilitate the management of all the users. Unless specifically stated differently, a user or a corresponding user ID is interchangeably used herein to identify a human user, a software agent, or a group of users and/or software agents. Besides a human user who needs to access a secured document, a software application or agent sometimes needs to access the secured document in order to proceed forward. Accordingly, unless specifically stated, the "user" as used herein does not necessarily pertain to a human being. In general, a user who will access a secured document is associated with a user key to allow an encrypted header in a secured document to be unlocked (decrypted). The expiration or regeneration of a user key may be initiated by the system administrator. According to one embodiment, the administration interface 326 is a user graphic interface showing options for various tasks that an authenticated system administrator or operator may need to perform.

Account Manager 328:

Essentially, the account manager is a database or an interface to a database 327 (e.g., an Oracle database) maintaining all the registered users and their respective access privileges, and perhaps corresponding user keys (e.g., private and public keys). In operation, the account manager 328 authenticates a user when the user logs onto the server 320 and also determines if the user can access secured documents from the location the user is currently at.

System Parameters Manager 330:

This module is configured to manage system parameters within the server module 322. These system parameters include, for example, user access privileges, system rules, and user keys. The system parameters manager 330 can be used to add, delete or modify any of the system parameters. The system parameters manager 330 can also interact with local modules and client modules to supply the system parameters to these distributed modules. For example, a user key can be expired (deleted) for security reasons when a user leaves the organization or when its time to replace the user key. The system parameters can be supplied to local modules and client modules by a "push" of system parameters to the other distributed modules or by a response to a "pull" request for updated system parameters.

User Monitor 332:

This module is configured to monitor user's requests and whereabouts. Typically, a user is granted to access secured documents from one or more designated locations or networked computers. If a user has a higher access privilege (e.g., to permit to access from other than the locations or networked computers), the user monitor 332 may be configured to ensure that the user can have only one access from one of the registered locations or computers at all times. In addition, the user monitor 332 may be configured and scheduled to interact with the system parameters manager 330 to "push" an update of system parameters or respond to a "pull" request for an update of system parameters.

Local Server Manager 334:

This module is designed to be responsible for distributing an appropriate local module for a local server servicing a predetermined location or a predetermined group of users. According to one embodiment, the local server manager 334 replicates some or all of the server module 322 being executed on the server 320 and distributes the replicated copy to all the local servers. As a result, a user can access secured documents anywhere within the network premises covered by the local servers without being authenticated at a single central server, namely the server 320. According to another embodiment, the local server manager 334 replicates some of the server module 322 being executed on the server 320 and distributes the replicated copy to a corresponding local server. In this embodiment, each of the local servers will have its own customized replication from the server module 322.

Partners Access Manager 336:

A special module to manage non-employees accounts. The non-employees may be consultants to a business that requires the consultants to access certain secured documents. The partners access manager 336 generally works in accordance with other modules in the server but puts additional restrictions on such users being directly managed by the partners access manager 336. In one application, the partners access manager 336 generates a request to the user key manager 330 to expire a key or key pair for a consultant when an engagement with the consultant ends.

Access Report Manager 338:

A module is configured to record or track possible access activities and primarily works with a corresponding sub-module in a client module being executed in a client machine. The access report manager 338 is preferably activated by the system administrator and the contents gathered in the access report manager 338 and is typically only accessible by the system administrator.

Rules Manager 339:

In general, the rules manager 339 is an enforcement mechanism of various access rules. According to one aspect, the rules manager 339 is configured to specify rules based on i) data types (e.g., Microsoft Word), ii) group users or individual, iii) applicable rights, and iv) duration of access rules. Typically, a set of rules is a policy (namely, a security policy). A policy can be enabled, disabled, edited, deployed and undone (e.g., one or two levels). Policies managed by the rules manager 339 operate preferably on a global level. The rules (as well as other system parameters) are typically downloaded to the client machine during the login process (after the user is authenticated) and can be updated dynamically. In addition, respective policies may be associated with active folders (i.e., those designated places to store secured documents). These polices are also downloaded and updated on the client machine. Simple policies can also be embedded in the document and provide document specific policies.

According to one embodiment, a header is received by a local server from a client and the access rules from the header are retrieved. The key manager 330 can be called upon to decrypt the encrypted security information in the header. The rules manager 339 can then parse the access rules from the security information and evaluate or measure the access rules against the access privileges of the user to determine whether the secured document can be accessed by the user. If the evaluation or measurement succeeds, a file key is retrieved and sent back to the client.

It should be pointed out that the server module 322 in FIG. 3B lists some exemplary modules according to one embodiment of the present invention and not every module in the server module 322 has to be implemented in order to practice the present invention. Those skilled in the art can understand that given the description herein, various combinations of the modules as well as modifications thereof without departing the spirits of the present invention, may achieve various desired functions, benefits and advantages contemplated in the present invention.

FIG. 3C shows a functional block diagram of a local server device 340. The local server device 340 executes a module, referred herein as a local module 342 which is configured to be a complete or partial replication of the server module 322 of FIG. 3B. The local server device 340 is generally similar to that of a server as illustrated in FIG. 3B. Namely, the local server device 340 includes one or more processors 341, a memory space 343, a network interface 344, and a local storage space 345. Given the similarity, many parts illustrated in FIG. 3C are not to be described again to avoid obscuring aspects of the present invention. As one of the features in the present invention, the local module 342 provides the dependability, reliability and scalability of the centralized access control management being undertaken by the central server 320 of FIG. 3B. As such, not all authentication requests need to be handled at one central point without losing control of the access control management. As another feature of the present invention, the users are not affected if the central server is brought down for maintenance and the connection to the central server is not available. If a number of local servers are used and each has a replication of the server module, the reliability of servicing the users is greatly enhanced. As a result, the local users need only to check with the corresponding local server and none of the users would be affected if other local servers are down for whatever reasons or disconnected from the central server.

The configuration of a user's access to secured documents is sometimes referred to as a provisioning process. The dynamic provisioning that has been described above is believed to provide the necessary security means needed by a large enterprise having employees in several locations without the loss of the centralized access control management at a central server. Further, the use of multiple local servers to support the central server can provide increased dependability, reliability and scalability.

Referring now to FIG. 3D, there is shown a functional block diagram of a client machine 360. As used herein, the client machine 360 is a computing device primarily used by a user to access secured documents. The client machine 360 can, for example, be a desktop computer, a mobile device or a laptop computer. According to one embodiment, the client machine 360 includes a processor 361, a client module 362, a memory space 363, a network interface 365 and a local store 367. The client module 362 resides in the memory space 363 and, when executed by the processor 361, delivers features, advantages and benefits contemplated in the present invention. Through the network interface 365, the client machine 360 is capable of communicating over a data network with other computers, such as a server. From the client machine 360, a user can access secured documents located in a repository (store) 366 that may be in the client machine 360, another networked device, or other storage means. According to one embodiment, the client module 362 includes a number of sub-modules including an access report module 364, a user verifying module 370, a key manager 368, a document securing module 371 and an off-line access manager 374.

Access Report Module 364:

This module is a software agent configured to record access activity and associated with an authenticated user. It reports to an access report module in the central server so that a record may be established as to what secured document has been accessed by which user during what time. In particular, the access report module 364 can be activated to capture access activities of the user when the client machine is not networked. The access activities will be later synchronized with the counterpart in the server to facilitate the access control management for the offline access.

Key Manager 368:

One of the purposes for the key manager 368 is to ensure that a secured document is still usable when the secured document is being accessed by an application that suddenly crashes. According to one embodiment, after the encrypted header is decrypted, the file key is then copied or a copy thereof is stored (cached) into the key manager 368. The file key is then used to decrypt the encrypted document. A clear document is now available to the application. If the application crashes due to power outage or interfered by another application or OS, the file key in the header could be damaged. If no copy of the file key is available, the secured document may not be usable any more because the encrypted document would not be decrypted without the file key. In this case, the reserved key maintained in the key manager 368 can be used to replace the damaged key and decrypt the encrypted document. After the user saves the file again, the file key is put back into the header. Another purpose for the key manager 368 is to cache a user key or keys of an authenticated user.

User Verifying Module 370:

This module is responsible for determining if a user who is accessing a secured document has been authenticated otherwise it will initiate a request for authentication with a local server or a central server. In other words, the user verifying module 370 is always consulted before a permission is granted to the user seeking access to a secured document. According to one embodiment, a user key or keys of an authenticated user are stored (cached) in the key manager 368 once the user is authenticated by the user verifying module 370 via the server. When a secured document is accessed, the user key must be retrieved from the key manager 368 to decrypt the encrypted security information in the header of the secured document.

Document Securing Module 371:

As described above, the DSM 371 includes a cipher 372 that is used to generate a file/user key and encrypt/decrypt a document/header. In addition, other securing means may be implemented in the DSM 371, for example, a filter to block copying contents in a secured document into a non-secured document or a link from a secured document/original source to another document or recipient source.

Off-Line Access Manager 374:

This module becomes effective only when the networked client machine is off the network, namely, the communication with a local server or a central server is not currently available. For example, a user is on the road and still needs to access some secured documents in a laptop computer. When live consultation is not available, the off-line access manager 374 is activated to ensure that the authorized user still can access the secured document but only for a limited time and perhaps with a limited privilege.

It should be pointed out that the client module 362 in FIG. 3D lists some exemplary sub-modules according to one embodiment of the present invention and not every module in the server module 362 has to be implemented in order to practice the present invention. Those skilled in the art can understand that given the description herein, various combinations of the sub-modules, may achieve certain functions, benefits and advantages contemplated in the present invention.

Figure 4:
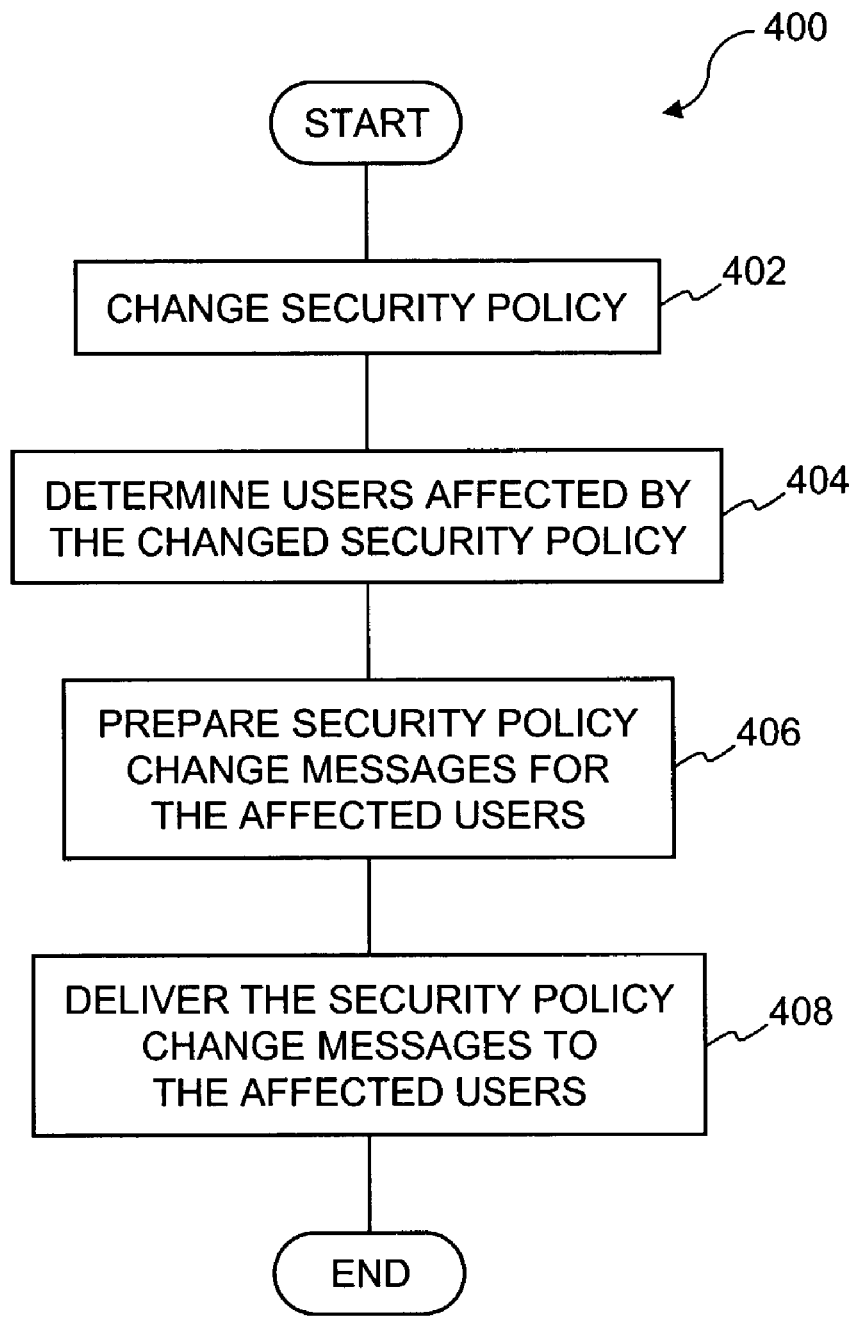
FIG. 4 is a flow diagram of security policy change processing according to one embodiment of the invention.

FIG. 4 is a flow diagram of security policy change processing 400 according to one embodiment of the invention. The security policy change processing 400 can, for example, be performed by a security system, such as the security system 300 illustrated in FIG. 3.

A security policy change processing 400 begins with a security policy change 402. Here, typically, an administrator would interact with the security system to change a security policy, for example, via the administrative interface 326 of FIG. 3B. Next, those users that are affected by the changed security policy are determined 404. Unless to be applied to all users or user computers in the system, the changed security policy is targeted to applicable users. In other words, the changed security policy may be applied to only one user or a group of users or the terminals to be used by the user or the group of users. Depending on the changed security policy, the affected users may be determined in accordance with the account manager 328 of FIG. 3B. Then, security policy change messages are prepared 406 for the affected users, which can be performed in either the central server or the local server. In one embodiment, a changed security policy is pushed to a destination address identifying a computer being used by a user affected by the changed security policy. In another embodiment, a changed security policy is multicast to a plurality addresses respectively identifying computers being used by a number of identified users. In still another embodiment, a changed security policy is cached in a queue and pending a detected presence of an affected user (e.g., from a user monitor 332). In any case, after the security policy change messages have been prepared 406, the security policy change messages can be delivered 408 to the affected users. Here, the security policy change messages are normally delivered 408 to computers (i.e., user computers) that are being utilized by the affected users. In one embodiment, the security policy change messages can be delivered together with or in other routing messages. For example, a user state message can be downloaded into a user machine when a user logs into a security system (e.g., a local server). The user state message may include user account information and various customized system policies to facilitate access by the user to electronic data secured in the security system. In this case, a security policy change can be effectuated in the user state message. If the user is on-line, an updated user state message is immediately pushed to the affected user. If the user is not on-line, the security policy change takes effect in the user state message that is to be delivered next time the user logs on. Following the operation 408, the security policy change processing 400 is complete and ends.

Figure 5:
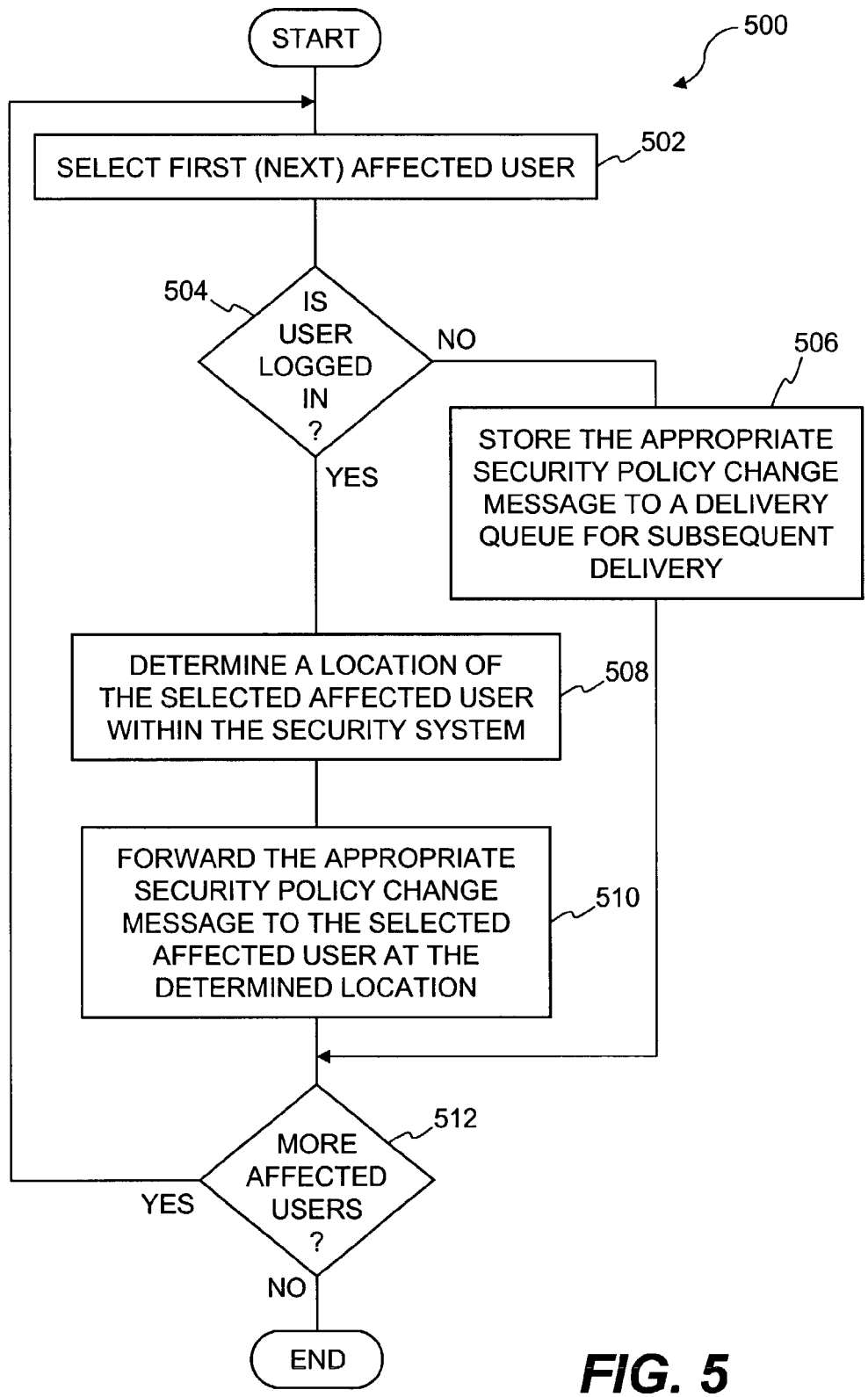
FIG. 5 is a flow diagram of security policy change message delivery processing according to one embodiment of the invention.

FIG. 5 is a flow diagram of security policy change message delivery processing 500 according to one embodiment of the invention. The security policy change message delivery processing 500, for example, is detailed processing associated with the delivery 408 of the security policy change messages to the affected users (i.e., computers of the affected users). In other words, the security policy change message delivery processing 500 is, for example, suitable for use as the operation 408 illustrated in FIG. 4 according to one embodiment of the invention.

The security policy change message delivery processing 500 initially selects 502 a first (next) affected user. Here, it is assumed that it has previously been determined that there are one or more affected users. After the first affected user has been selected 502, a decision 504 determines whether the user is presently logged in. A user is logged in when the user has been authenticated by the system and approved for certain access rights to items being secured by the security system. When the decision 504 determines that the user is not presently logged in, the appropriate security policy change message is stored 506 to a delivery queue or effectuated in the user state message associated with the user for subsequent delivery. Here, the delivery queue is a buffer that is able to store a plurality of security policy change messages that are to be subsequently delivered. Alternatively, the delivery queue may be viewed as a user state message that receives the appropriate security policy change message and subsequent changes, if there are any.

On the other hand, when the decision 504 determines that the user is logged in, a location (e.g., computer) of the selected affected user is determined 508 within the security system. Next, the appropriate security policy change message is then forwarded 510 to the selected affected user at the determined location (e.g., computer). Following the operation 506 as well as following the operation 510, a decision 512 determines whether there are more affected users to be processed. When the decision 512 determines that there are more affected users, the security policy change message delivery processing 500 returns to repeat the operation 502 and subsequent operations so that security policy change messages for other of the affected users can be similarly processed. Alternatively, when the decision 512 determines that there are no more affected users, the security policy change message delivery processing 500 is complete and ends.

Figure 6A:
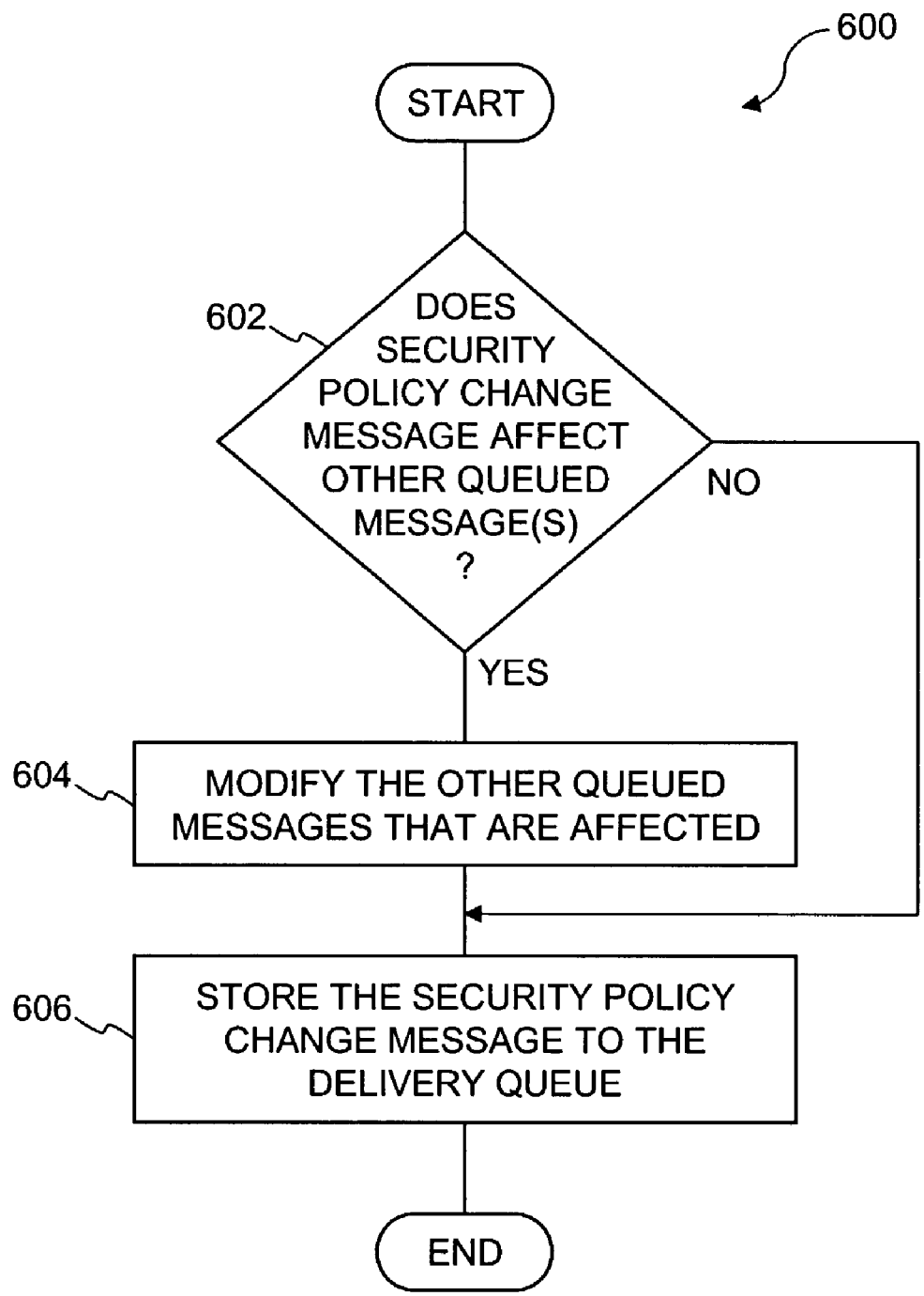
FIG. 6A is a flow diagram of security policy change queue storage processing according to one embodiment of the invention.

FIG. 6A is a flow diagram of security policy change queue storage processing 600 according to one embodiment of the invention. The security policy change queue storage processing 600 is, for example, performed by the operation 506 illustrated in FIG. 5. According to the security policy change queue storage processing 600, security policy change messages are able to be manipulated while they await delivery such that stale or erroneous security policy change messages can be altered. As a result, security policy change messages destined for the same affected user can be consolidated for improved efficiency and reliability.

The security policy change queue storage processing 600 begins with a decision 602. The decision 602 determines whether the security policy change message being stored to a delivery queue affects any of the other queued messages already stored in the delivery queue. When the decision 602 determines that the security policy change message does affect other previously queued messages, then the other queued messages that are affected can be modified 604. Alternatively, when the decision 602 determines that the security policy change message does not affect the other queued messages, then the operation 604 can be bypassed. Thereafter, following the operation 604 as well as following the operation 602 when the decision has determined that there are no other queued messages that are affected, the security policy change message is stored 606 to the delivery queue. Following the operation 606, the security policy change message is stored 606 to the delivery queue. Following the operation 606, the security policy change queue storage processing 600.

An example of a simplified delivery queue is as follows:

| UserID | Stored Message |
| --- | --- |
| 12345 | M34; M33; M32; M21 |
| 12678 | M40 |
| 34267 | M99; M87; M34 |

Note that the simplified delivery queue stores messages that are deferred in their delivery to the corresponding users. Each user has a unique user identifier (UserID). The messages deferred for particular users are affiliated with one another. For example, for the user having the UserID of "12345", the simplified delivery queue stores four message (M21; M32; M33 and M34). Note that the order of the messages is retained in the simplified delivery queue using a first-in-first-out approach, such that the message M21 is first sent to the user having the UserID of "12345". However, the earlier queued massages within the simplified delivery queue can be modified due to subsequent messages. For example, as to the messages for the user having the UserID of "12345", when the fourth queued message M34 is about to be stored to the simplified delivery queue, the security system (e.g., the processing of FIG. 6) can operate to modify one or more of the queued messages M33, M32 or M21. As a simple example, assume that message M21 removed the user having the UserID of "12345" from the engineering team 3. If the subsequent message M33 adds the user having the UserID of "12345" back to the engineering design team 3, then the earlier message M21 can be deleted or replaced with the message M33. As a result, the messages M21 and M33 are able to be collapsed into a single message, which improves bandwidth utilization and minimize unnecessary interruption to the user and provides that the affected user receives the most updated policy change.

Security policies including system policies and access rules protect or secure electronic data. In general, the access rules are provided in a secured item and have been previously described. The system policies are rules that provide restrictions imposed by the system. Examples of the various levels of rules may include one or more system rule sets at a server machine and/or a client machine, a special rule set imposed by a system operator and the rule set associated with or embedded in a secured file. In dealing with highly sensitive files, a system rule can limit a user to accessing certain secured documents from only certain designated computers. In a distributed system in which a number of local servers are used, some of the changes to the system rules may only originate from a central server to one or more of the local servers being affected. Similarly, some of the changes to the system rules may only originate from one or more of the local servers to one or more of the user computers being affected.

Figure 6B:
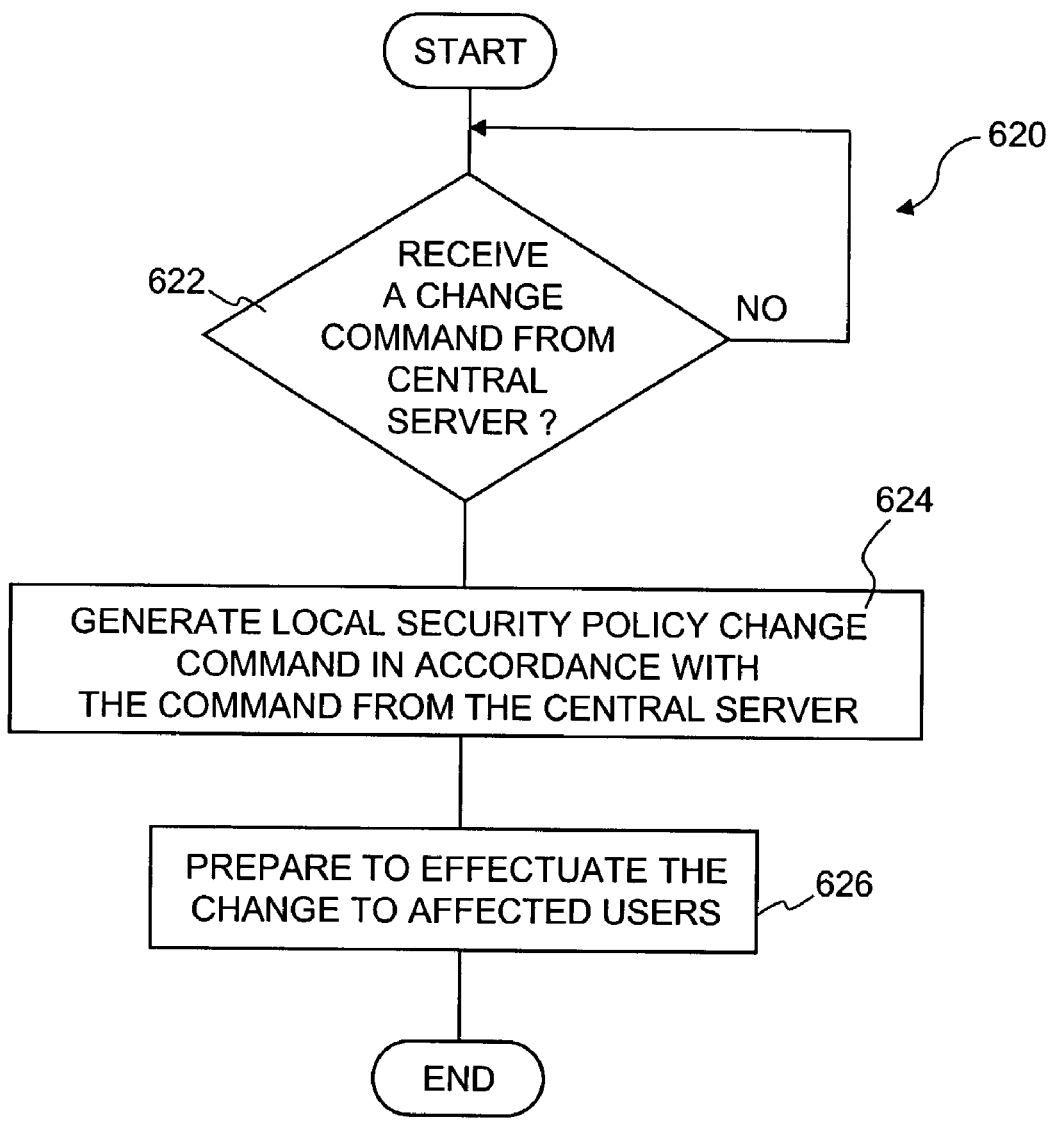
FIG. 6B is a flow diagram of efficiently delivering security policy change in a distributed network according to one embodiment of the invention.

FIG. 6B is a flow diagram of how to efficiently effectuate a security policy change in a distributed network according to one embodiment of the invention. The security policy change pertains to changes between two entities. In other words, an update or change command is initiated from a central server to a local server. The local server is then activated to generate a change for the affected users in accordance with the change command received from the central server. One of the features in the operation 620 is that the network efficiency is achieved. The update commands or update messages are distributed only to those involved. In general, the operation 620 can be, for example, performed in the local server 304 of FIG. 3A or in accordance with the operation 400 illustrated in FIG. 4.

The operation 620 is activated when a command including a policy change or a policy change request is received 622 from a server (e.g., a central server or another server). For example, a command, e.g., notifyAddedUserGenSysRight meaning that a specific system right has been added to the user, is received. Upon receiving the command, the local server generates a corresponding command (e.g., notifyAddedGroupGenSysRight) in accordance with the command from the central server. Depending on the affected user that may be present or absent in the system, the corresponding command may be pushed 626 to the user to effectuate the policy change or queued in a queue, or take effect in the user state message.

In general, there is a plurality of local servers to a central server. To achieve the network efficiency, the server needs first to determine which local servers may be activated to carry on a policy change being initiated. Since each of the local servers is configured to manage its own users while the local servers are being managed by the central server, a local server that serves an affected user can be readily identified. Additional details on identifying affected users is provided in U.S. patent application Ser. No. 10/074,194. When such local server is identified, the command to effect the policy change needs to be pushed only to the local server. Subsequently, the local server needs to generate a command to affect the policy change and deliver such command only to the effected users. As a result, no other local servers are affected, and nor other users are affected by the policy change but served by the same local server.

The following table illustrates some exemplary commands to carry out a system policy update or change originated from a central server to a local server:

| | | |
|---|---|---|
| void | notifyAddedGroupGenSysRight(String groupId, int rightKey) | |
| | notifies a local server that a general system right has been added to the group | |
| void | notifyAddedGroupSpecSysRight(String groupId, int rightKey, String pertinentGroupId) | |
| | notifies a local server that a specific system right has been added to the group | |
| void | notifyAddedUserAllowedHost(String userId, String host) | |
| | notifies a local server that a host has been allowed for a user | |
| void | notifyAddedUserGenSysRight(String userId, int rightKey) | |
| | notifies a local server that a general system right has been added to the user | |
| void | notifyAddedUserSpecSysRight(String userId, int rightKey, String pertinentGroupId) | |
| | notifies a local server that a specific system right has been added to the user | |
| void | notifyAddedUsersToGroup(ArrayList userIds, String groupId) | |
| | notifies a local server that users have been added to a group | |
| void | notifyChangedFolder(String invokerId, String path, ArrayList affectedGroups) | |
| | notifies a local server that an active folder has been changed | |
| void | notifyChangedFolderAccesserGroups(String activeFolderId, ArrayList accesserGroupIds, ArrayList affectedGroups) | |
| | notifies a local server that an active folder's access groups have been changed | |
| void | notifyChangedGroupFolders(String groupId, ArrayList folderIds) | |
| | notifies a local server that the group's active folders have been changed | |
| void | notifyChangedGroupKeyPair(String groupId, byte[ ] newGroupPubKey, byte [ ] newGroupPrivKey) | |
| void | notifyChangedGroupRuleSets(String groupId, ArrayList rulesetIds) | |
| | notifies a local server that a group's rule sets have been changed. | |
| void | notifyChangedRule(String ruleId, HashMap rule, ArrayList affectedGroups) | |
| | notifies a local server that a rule has been changed | |
| void | notifyChangedRuleSet(String rulesetId, String name, ArrayList affectedGroups) | |
| | notifies a local server that a rule set has been changed | |
| void | notifyChangedRuleSetRules(String rulesetId, ArrayList ruleIds, ArrayList affectedGroups) | |
| | notifies a local server that a rule set's member rules have been changed | |
| void | notifyChangedUserDefaultGroup(String userId, String newDefaultGroupId) | |
| | notifies a local server that a user's default group has changed | |
| void | notifyChangedUserLS(String userId) | |
| | notifies a local server that the user's local server has been switched | |
| void | notifyChangedUserUIPref(String userId, byte[ ] newUIPref) | |
| | notifies a local server that a user's user interface (UI) preference has changed. | |
| void | notifyDroppedGroup(String droppedGroupId) | |
| | notifies a local server that a group has been dropped | |
| void | notifyDroppedGroupGenSysRight(String groupId, int rightKey) | |
| | notifies a local server that a general system right has been dropped from the group | |
| void | notifyDroppedGroupSpecSysRight(String groupId, int rightKey, String pertinentGroupId) | |
| | notifies a local server that a specific system right has been dropped from the group | |
| void | notifyDroppedUser(String userId) | |
| | notifies a local server that a user has been dropped | |
| void | notifyDroppedUserAllowedHost(String userId, String host) | |
| | notifies a local server that a host has been disallowed for a user | |
| void | notifyDroppedUserGenSysRight(String userId, int rightKey) | |
| | notifies a local server that a general system right has been dropped from the user | |
| void | notifyDroppedUsersFromGroup(ArrayList userIds, String groupId) | |
| | notifies a local server that users have been dropped from the group, in case of dropGroupMember | |
| void | notifyDroppedUserSpecSysRight(String userId, int rightKey, String pertinentGroupId) | |
| | notifies a local server that a specific system right has been dropped from the user | |
| String | notifyNewCentralServerList(ArrayList newUrls) | |
| | notifies a local server about a new central server URL list | |

The following table illustrates some exemplary commands to carry out a system policy update or change originated from a local server to a user computer or client machine (CM):

| | | |
|---|---|---|
| int | notifyAddedDocRule(int policyId, int docRuleId, byte[ ] docRuleText) | |
| | notifies the CM that a doc rule has been added to a policy | |
| int | notifyAddedGroupGenSysRight(String userId, String groupId, int rightKey) | |
| | notifies a CM that a general system right has been added to the group | |
| int | notifyAddedGroupSpecSysRight(String userId, String groupId, int rightKey, String pertinentGroupId) | |
| | notifies a CM that a specific system right has been added to the group | |

```
int  notifyAddedPolicy(int policyId, String policyName)
         notifies a CM that a new policy has been created
int  notifyAddedUserGenSysRight(String userId, int rightKey)
         notifies a CM that a general system right has been added to the user
int  notifyAddedUserSpecSysRight(String userId, int rightKey, String pertinentGroupId)
         notifies a CM that a specific system right has been added to the user
int  notifyAddedUserToGroup(String userId, String newGroupId, HashMap newGroupInfo)
         notifies a CM that the user now belongs to a new group
int  notifyChangedActiveFolderTree(String userId, String newTree)
         notifies a CM that the active folder tree has been changed
int  notifyChangedDocRuleText(int policyId, int docRuleId, byte[ ] newDocRuleText)
         notifies a CM that a document rule has been modified
int  notifyChangedGroupKeyPair(String userId, String groupId, byte[ ] groupPubKey, byte [ ] groupPrivKey)
         notifies a CM that a group key pair has been changed
int  notifyChangedSystemRules(String userId, String newRules)
         notifies a CM that the system rules have been changed
int  notifyChangedUserDefaultGroup(String userId, String newDefaultGroup)
         notifies a CM that the user's default group has changed
int  notifyDroppedDocRule(int policyId, int docRuleId)
         notifies a CM that a document rule has been dropped from a policy
int  notifyDroppedGroupGenSysRight(String userId, String groupId, int rightKey)
         notifies a CM that a general system right has been dropped from the group
int  notifyDroppedGroupSpecSysRight(String userId, String groupId, int rightKey, String pertinentGroupId)
         notifies a CM that a specific system right has been dropped from the group
int  notifyDroppedPolicy(int policyId)
         notifies a CM that a new policy has been dropped
int  notifyDroppedUserFromGroup(String userId, String groupId)
         notifies a CM that the user has been dropped from a group
int  notifyDroppedUserGenSysRight(String userId, int rightKey)
         notifies a CM that a general system right has been dropped from the user
int  notifyDroppedUserSpecSysRight(String userId, int rightKey, String pertinentGroupId)
         notifies a CM that a specific system right has been dropped from the user
int  notifyUserForcedLogout(String userId, int flag)
         notifies that the user needs to be logged out, for various reasons.
```

According to one embodiment, the access control management is performed in a distributed fashion to ensure that an update or change is guaranteed to be delivered to an affected user even if an affected local server is not operative at the time an update shall be effectuated. Namely, a number of local server servers are employed to operate largely on behalf of a central server responsible for the centralized access control management. Such distributed fashion ensures the dependability, reliability and scalability of the access control management undertaken by the central server, the detail of which is provided in U.S. patent application Ser. No. 10/074,194.

In operation, according to one embodiment, every update to an affected user or a user computer is assigned an identifier. A server (e.g., a local or central server) can be configured to keep track of all identifiers for the updates it has generated or responded to. If, for some reason, a local server is not operative at the time an update command shall be received or an update message (or contained in a state message) should be released to an affected user, the central server can be configured to keep track of the update that is meant for that local server up to a certain limit. When the local server comes up again, it will get the appropriate updates that were saved on its behalf from the central server. Alternatively, since user information may be in one or more of the local servers being serviced by the central server, the central server can be configured to send a copy of that update command or update message to the local servers that maintain the user information for the affected user. When the affected user needs to get on the originally designed local server that is now inoperative, the affected user (i.e., the computer being used) is redirected to another local server that has the user information of the user, accordingly, the user receives the update. Since the updates are identified with respective identifiers, the same updates would not be applied more than once but guaranteed to be delivered to the affected user(s).

In any case, all applicable system rules as well as access rules embedded in a secure file are individually evaluated in an access right evaluation process when a user is attempting to access a secured item or secured area (e.g., a storage device). If there is a single logic failure from the evaluation of any of the system rules or the access rules, an access right to the secured file is denied. On the other hand, if each of the system rules and the access rules is respectively evaluated and all produce a logic pass, an access right to the secured file or area is granted.

In one embodiment, a system rule set may be classified as Regular and Super. A system rule set is Regular when the rule set is to be evaluated together with other system rules, if there are any. On the other hand, a system rule set is Super when the rule set is to be evaluated without considering the system rules that are Regular. In other words, a Super system rules provide an override mechanism used to force either a grant or a denial of the access right regardless of the other Regular rule(s). Typically, a Super rule is used by a system administrator to grant a special access right to a user who otherwise would not get in a normal setting.

Figure 7:
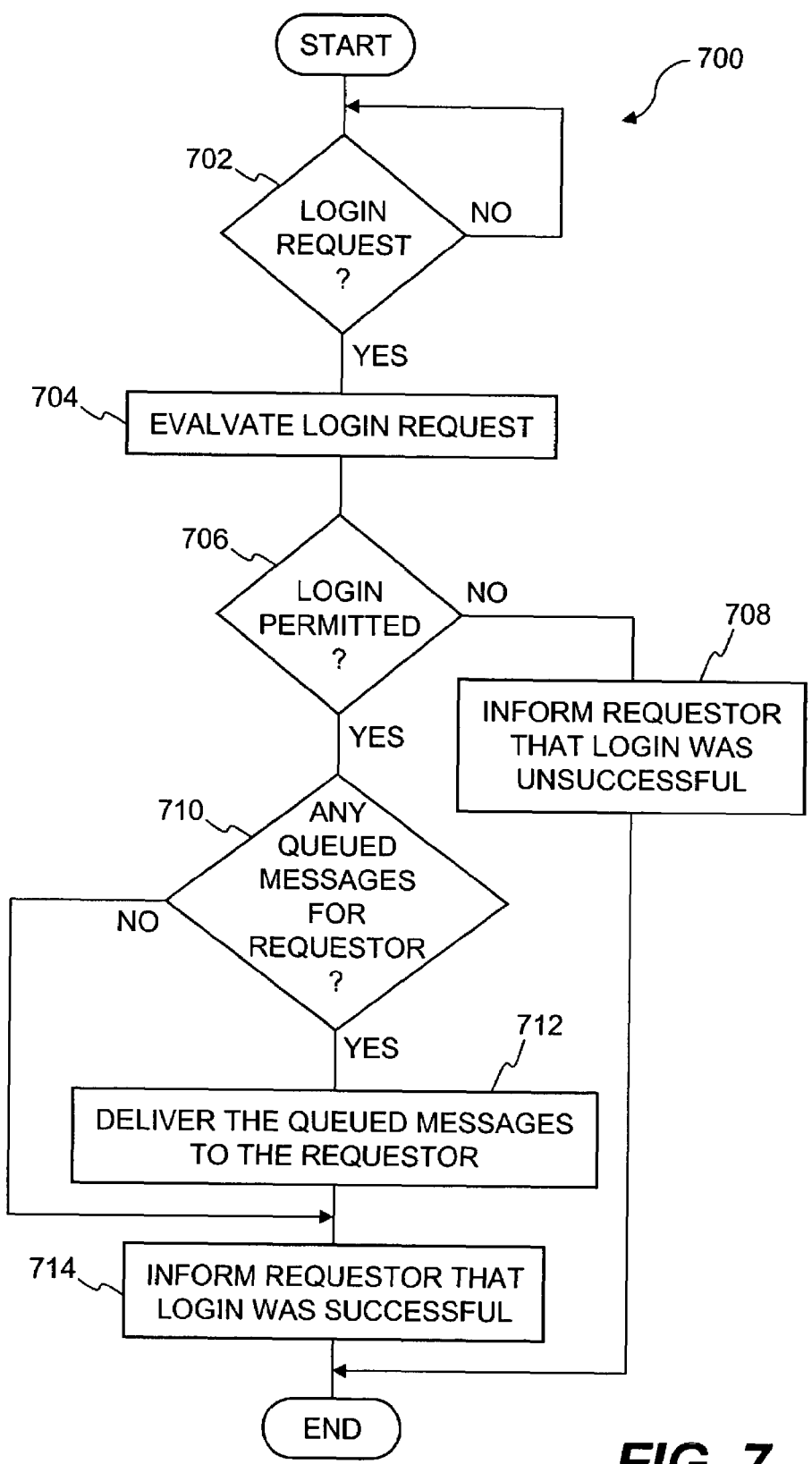
FIG. 7 is a flow diagram of deferred delivery processing according to one embodiment of the invention.

FIG. 7 is a flow diagram of deferred delivery processing 700 according to one embodiment of the invention. The deferred delivery processing 700 is utilized to deliver messages (e.g., security policy change messages and state messages) from a delivery queue to their destinations. In this embodiment, the deferred delivery processing 700 is performed during a login by an affected user.

The deferred delivery processing 700 begins with a decision 702 that determines whether a login request has been received. Here, a login request is initialed by a user attempting to access an item maintained or secured by the security system. When the decision 702 determines that a login request has not yet been received, then the deferred delivery processing 700 awaits such a request. Once the decision 702 determines that the login request has been received, the login request is evaluated 704. Additional details on the evaluation of login request can be found in U.S. application Ser. No. 10/074,194, which was previously hereby incorporated herein by reference.

After the login request is evaluated 704, a decision 706 determines whether the login is permitted. When the decision 706 determines that the login is not permitted, then the requestor (i.e., requesting user) is informed 708 that the login was unsuccessful. In the other hand, when the decision 706 determines that the login is permitted, then a decision 710 determines whether there are any queued messages from the requestor. Here, when the login is permitted, the deferred delivery processing 700 determines 710 whether there are any queued messages for the requestor that has not yet been delivered. Accordingly, then the decision 710 determines that there are queued messages for the requester, the queued messages are delivered 712 to the requestor. Here the queued messages for the requester are retrieved from the delivery queue and forwarded to the requester (i.e., forwarded to the computer used by the requester). The state messages may contain security policy changes (or possibly other system parameters) that are stored, installed or effectuated on the computer used by the requestor (user computer or client machine). These system parameters can be stored in an encrypted manner or stored in a hidden cache memory. Alternatively, when the decision 710 determines that there are no queued messages for the requester, then the operation 712 is bypassed. Next, following the operation 712 (or following the decision when the operation 712 is bypassed), the requester is informed 714 that the login was successful. Following the operations 708 and 714, the deferred delivery processing 700 is complete and ends.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include tangible media such as read-only memory, random-access memory, CD-ROMs, DVDs, magnetic tape, and optical data storage devices. Examples of transmission media include carrier waves. The tangible computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that policy changes are distributed only to those user computers (clients) that are affected by the policy changes. Another advantage of the invention is that policy changes are implemented timely, transparently and without user interaction. Still another advantage of the invention is that informing user computers about policy changes can be deferred until associated users are on-line (i.e., logged into security system).

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A method for distributing a security policy change within a security system distributed over a computer network, the computer network having at least a server machine and a plurality of user computers, said method comprising:
   (a) receiving a security policy change at a server machine of the computer network;
   (b) determining those one or more users that are affected by the security policy change;
   (c) preparing a security policy change message for the one or more users that are determined to be affected by the security policy change;
   (d) delivering the one or more security policy change messages to the user computers associated with the affected users who are logged into the system in such a manner as to be able to receive the security policy change message, and
   (e) caching the security policy changing messages for users not logged into the system in such a manner so as to be able to receive the security policy change messages.

2. The method as recited in claim 1, whereby only the user computers associated with the affected users receive the security policy change messages.

3. The method as recited in claim 1, wherein the security policy change alters at least one of an access rule or a group's membership.

4. The method as recited in claim 1, wherein the computer network is an enterprise computer network.

5. The method as recited in claim 1, wherein the security policy change, when effectuated, affects restrictive access to files secured by the security system.

6. The method as recited in claim 1, wherein the security policy change messages cause an action at the user computers that receive the security policy change messages.

7. The method as recited in claim 6, wherein the action is a forced logout of at least one of the user computers from the security system.

8. The method as recited in claim 1, wherein said delivering comprises:
   deferring delivery of at least one the one or more security policy change messages that are destined for the user computers associated with the affected users.

9. The method as recited in claim 1, wherein said delivering (d) comprises:
   (d1) determining whether the affected users are logged into the security system, and
   (d2) deferring delivery of the one or more security policy change messages that are destined for the user computers associated with the affected users that are not logged into the security system.

10. The method as recited in claim 9, further comprising
    (e) subsequently delivering one or more of the security policy change messages that have been deferred and cached to the corresponding affected users when the corresponding affected users subsequently log into the security system.

11. The method as recited in claim 9, wherein said deferring (d2) operates to store the one or more security policy change messages being deferred into a delivery queue.

12. The method as recited in claim 1, wherein said delivering (d) comprises:
(d1) determining locations for the affected users within the security system, and
(d2) forwarding the one or more security policy change messages to corresponding ones of the users' computers at the determined locations for the affected users.

13. The method as recited in claim 1, wherein said caching (e) comprises:
(e1) identifying at least one of the one or more security policy change messages that is to be delivered on a deferred basis;
(e2) determining whether the identified security policy change message affects any other security policy changes messages resident in a delivery queue; and
(e3) modifying one or more of the other security policy change messages in the delivery queue based at least in part on the identified security policy change message.

14. The method as recited in claim 13, wherein said caching (e) further comprises:
(e4) storing the identified security policy change message into the delivery queue, whereby the identified security policy change message is thereafter delivered on a deferred basis.

15. The method as recited in claim 13, wherein said caching (e) further comprises:
(e4) storing the identified security policy change message into the delivery queue; and
(e5) subsequently delivering one or more of the security policy change messages that have been stored in the delivery queue to the corresponding affected users when the corresponding affected users subsequently log into the security system.

16. A tangible computer readable storage medium having computer program code recorded thereon, that when executed by a processor, causes a processor to distribute a security policy change within a security system distributed over a computer network, the computer network having at least a server machine and a plurality of user computers, the computer readable storage medium comprising:
computer program code that enables the processor to receive a security policy change at a server machine of the computer network;
computer program code that enables the processor to determine those one or more users that are affected by the security policy change;
computer program code that enables the processor to prepare a security policy change message for the one or more users that are determined to be affected by the security policy change; and
computer program code that enables the processor to (a) deliver the one or more security policy change messages to the user computers associated with the affected users who are logged into the system in such a manner as to be able to receive such policy change message, and (b) cache policy changing messages for users not logged into the system in such a manner so as to be able to receive such policy change messages.

17. The computer readable storage medium as recited in claim 16, wherein said computer program code for delivering comprises:
computer program code that enables the processor to defer delivery of at least one the one or more security policy change messages that are destined for the user computers associated with the affected users.

18. The computer readable storage medium as recited in claim 16, wherein the computer program code that enables the processor to deliver for delivering comprises:
computer program code that enables the processor to determine whether the affected users are logged into the security system, and
computer program code that enables the processor to defer delivery of the one or more security policy change messages that are destined for the user computers associated with the affected users that are not logged into the security system.

19. The computer readable storage medium as recited in claim 18, wherein said computer program code for delivering further comprises:
computer program code that enables the processor to subsequently deliver one or more of the security policy change messages that have been deferred to the corresponding affected users when the corresponding affected users subsequently log into the security system.

20. The computer storage readable medium as recited in claim 16, wherein said computer program code for delivering comprises:
computer program code that enables the processor to determine locations for the affected users within the security system, and
computer program code that enables the processor to forward the one or more security policy change messages to corresponding ones of the users' computers at the determined locations for the affected users.

21. The computer readable storage medium as recited in claim 16, wherein the computer program code for delivering comprises:
computer program code that enables the processor to identify at least one of the one or more security policy change messages that is to be delivered on a deferred basis;
computer program code that enables the processor to determine whether the identified security policy change message affects any other security policy changes messages resident in a delivery queue; and
computer program code that enables the processor to modify one or more of the other security policy change messages in the delivery queue based at least in part on the identified security policy change message.

22. The computer readable storage medium as recited in claim 21, wherein the computer program code that enables the processor to deliver further comprises:
computer program code that enables the processor to store the identified security policy change message into the delivery queue; and
computer program code for subsequently delivering one or more of the security policy change messages that have been stored in the delivery queue to the corresponding affected users when the corresponding affected users subsequently log into the security system.

* * * * *